(12) United States Patent
Saraogee et al.

(10) Patent No.: US 11,085,788 B2
(45) Date of Patent: Aug. 10, 2021

(54) LANE AND SMART GUIDANCE BETWEEN NAVIGATION MANEUVERS

(71) Applicant: Apple Inc., Cupertino, CA (US)

(72) Inventors: Anil Saraogee, San Jose, CA (US); Mrinmayee Hingolikar, Sunnyvale, CA (US); Sofia Boutahar, Mountain View, CA (US); Justin Strawn, Larkspur, CA (US); Kieran K. Gupta, San Francisco, CA (US); Eric Grundstorm, Oakland, CA (US); Christopher Tremblay, San Jose, CA (US); Ilya Sandler, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 15/960,761

(22) Filed: Apr. 24, 2018

(65) Prior Publication Data

US 2018/0348008 A1    Dec. 6, 2018

Related U.S. Application Data

(60) Provisional application No. 62/514,555, filed on Jun. 2, 2017.

(51) Int. Cl.
*G01C 21/36* (2006.01)

(52) U.S. Cl.
CPC ..... *G01C 21/3658* (2013.01); *G01C 21/3626* (2013.01); *G01C 21/3629* (2013.01); *G01C 21/3655* (2013.01); *G01C 21/3676* (2013.01)

(58) Field of Classification Search
CPC ............ G01C 21/3658; G01C 21/3629; G01C 21/3655; G01C 21/3676; G01C 21/3626
See application file for complete search history.

(56) References Cited

U.S. PATENT DOCUMENTS

| | | | |
|---|---|---|---|
| 9,672,734 B1 * | 6/2017 | Ratnasingam | G08G 1/0968 |
| 9,726,505 B2 * | 8/2017 | Manoliu | G01C 21/26 |
| 2006/0009904 A1 * | 1/2006 | Sakashita | G01C 21/3658 701/437 |
| 2009/0024320 A1 * | 1/2009 | Nakamura | G08G 1/096827 701/414 |

(Continued)

FOREIGN PATENT DOCUMENTS

| | | | |
|---|---|---|---|
| JP | 2004-317405 | * | 11/2004 |
| JP | 4279587 B2 | * | 6/2009 |

OTHER PUBLICATIONS

Translation of JP-4279587 (Year: 2009).*
Translation of JP-2004317405 (Year: 2004).*

*Primary Examiner* — Jeff A Burke
*Assistant Examiner* — Joshua Alexander Garza
(74) *Attorney, Agent, or Firm* — Invoke

(57) ABSTRACT

In some implementations, a navigation service can provide a plurality of navigation instructions for a user to traverse a route to an intended destination. The navigation service can also identify at least one portion of the determined route that requires additional guidance based on one or more factors. For each portion of the route that requires additional guidance, the navigation service may generate one or more additional guidance instructions to be inserted within the plurality of navigation instructions, forming an enhanced set of instructions for traversing the route.

30 Claims, 18 Drawing Sheets

(56) References Cited

U.S. PATENT DOCUMENTS

| | | | |
|---|---|---|---|
| 2009/0143974 A1* | 6/2009 | Adachi | G01C 21/3658 |
| | | | 701/532 |
| 2009/0157294 A1* | 6/2009 | Geelen | G01C 21/3655 |
| | | | 701/532 |
| 2010/0036594 A1* | 2/2010 | Yamane | G08G 1/0104 |
| | | | 701/117 |
| 2010/0121569 A1* | 5/2010 | Nakamura | G01C 21/3658 |
| | | | 701/532 |
| 2013/0054136 A1* | 2/2013 | Tomita | G01C 21/3655 |
| | | | 701/428 |
| 2018/0237019 A1* | 8/2018 | Goto | B60W 30/12 |
| 2018/0299289 A1* | 10/2018 | Hill | G01C 21/3608 |

* cited by examiner

LANE AND SMART GUIDANCE BETWEEN NAVIGATION MANEUVERS

CLAIM OF BENEFIT TO PRIOR APPLICATION

This application claims the benefit of U.S. Provisional Application No. 62/514,555, filed Jun. 2, 2017, which is hereby incorporated by reference in its entirety.

TECHNICAL FIELD

The disclosure generally relates to providing navigation related features in a navigation service and application.

BACKGROUND

Mobile computing devices often include navigation features. A user can enter a starting location and a destination location in a user interface of the mobile device and the mobile device can calculate, or request from a server, a route and instructions for traversing the route from the starting location to the destination location. Often the navigation instructions can include a navigation display (e.g., map and highlighted route). The navigation instructions can include audio instructions that can tell the user which direction to go, which turn to take, etc.

These navigation features, however, can be improved. For example, navigation instructions are usually given at three distinct intervals: once after the prior instruction/maneuver was performed, once at about a mile away from the upcoming scheduled maneuver and once just before the upcoming maneuver is to be performed (e.g., 250 feet before the maneuver). Due to the time gap between instructions, it is possible for the user traversing the route to be in a lane that causes the user to go off-route. For example, the user can be in a designated lane forcing the user to make an unintended turn before the next scheduled maneuver (e.g., the user wants to go straight, but is in a lane designated for right turns only and the lane ends before the next scheduled maneuver). Similarly, the user may be forced to exit a highway/freeway before the next scheduled maneuver if e.g., the user is in a lane that becomes an exit ramp. Sometimes, when a road contains two of the same type of turns that are closely spaced together (e.g., two right turns in a row), the user may simply misinterpret the navigation instruction and turn onto the wrong road (e.g., the user turns too early or too late). Accordingly, there is a need and desire for a navigation service that provides additional guidance to the user to mitigate or eliminate the likelihood of unintended maneuvers.

SUMMARY

In some implementations, a navigation service can provide a plurality of navigation instructions for a user to traverse a route to a desired destination. The navigation service can also identify at least one portion of the determined route that requires additional guidance based on one or more factors. For each portion of the route that requires additional guidance, the navigation service can generate one or more additional guidance instructions to be inserted within the plurality of navigation instructions, forming an enhanced set of instructions for traversing the route.

In some implementations, the navigation service can segment portions of the route and determine lane connectivity and other properties of the segments to identify portions of the route that require additional guidance concerning e.g., lane position. In some implementations, the decision to provide additional guidance is based on one or more of a length of a lane in a road segment, a type of road segment, and/or a ratio of invalid lanes to valid lanes (or invalid lanes to total lanes) of the road segment. In addition to, or alternatively, the navigation service can identify portions of the determined route that require additional guidance before the user begins traversing the route, but based on a user's estimated or projected position along the route.

In some implementations, the navigation service can provide additional guidance concerning maneuvers and different types of road configurations that are not based solely on lane position. The navigation service can e.g., determine when a road contains two of the same type of maneuvers that are closely spaced together, which could lead to an unintended maneuver. The navigation service can create and insert smart guidance instructions to guide the user to the correct maneuver.

In some implementations, the navigation service can provide more or customized navigation instructions based on a location of the user device.

Particular implementations provide at least the following advantages. A navigation route is provided with additional guidance instructions (e.g., lane guidance and smart guidance instructions) to provide a user with an enhanced set of instructions for traversing the route. The additional guidance instructions should mitigate the likelihood or even prevent a user from making an unintended maneuver and going off-route by e.g., positioning the user in a proper lane, instructing the user to pass a particular road segment and/or to turn at a particular road segment.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Figure 1:
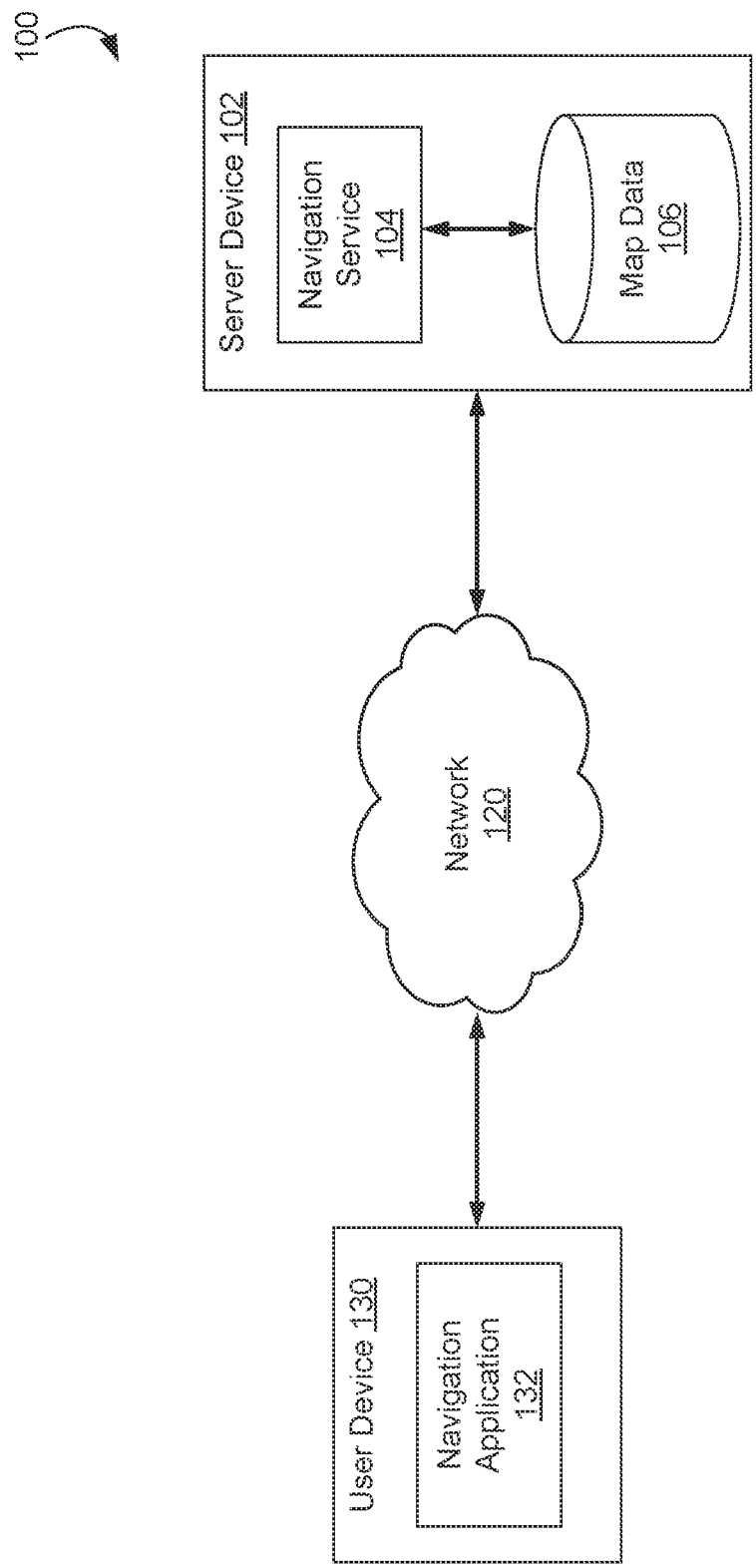
FIG. 1 is a block diagram of an example system for providing additional guidance (e.g., lane and smart guidance) in a navigation route.

FIG. 1 is a block diagram of an example system 100 for providing additional guidance e.g., between navigation maneuvers in a navigation route. In some implementations, system 100 can include server device 102. For example, server device 102 can represent a computing device or multiple computing devices associated with a navigation services provider. Server device 102 can correspond to well-known server hardware architectures and include processors for performing operations for providing navigation services, such as the lane and smart guidance described herein.

In some implementations, server device 102 can include navigation service 104. For example, navigation service 104 can be executed on a software server that provides backend processing for a navigation service provider. Navigation service 104 can, for example, obtain map data (e.g., map images, points of interest, navigation and/or routing information, etc.) from map database 106 and send a navigation route to various client devices (e.g., user device 130) so that the client devices can present navigation information to the users of the client devices. For example, navigation service 104 can send a navigation route to a client device while the client device is connected to server device 102 through network 120 (e.g., LAN, WAN, WLAN, Internet, etc.). The client device can present the route to the user using a map or navigation application on the client device.

In some implementations, user device 130 can be a computing device, such as a laptop computer, smart phone, tablet computer, and the like. User device 130 can be a wearable device, such as a smart watch, smart glasses, etc. User device 130 can be a media device, automobile entertainment system, etc.

In some implementations, user device 130 can include navigation application 132. For example, navigation application 132 can provide features that allow the user to search for and/or specify a destination. Navigation application 132 can be a mapping application that provides features that allow the user to view representations of maps corresponding to the user's current location, maps corresponding to a location associated with search results or other points of interest, and/or maps corresponding to a destination location or geographical area selected by the user. Navigation application 132 can receive user input requesting a route to the destination and navigation application 132 can present a route from a start location (e.g., the current location of user device 130, a user-specified location, etc.) to the specified destination In some implementations, navigation service 104 can provide navigation application 132 with a plurality of navigation instructions for a user to traverse the route. Navigation service 104 can also identify at least one portion of the determined route that requires additional guidance based on one or more factors. For each portion of the route that requires additional guidance, navigation service 104 may generate one or more additional guidance instructions to be inserted within the plurality of navigation instructions, forming an enhanced set of instructions for traversing the route with additional guidance that improves existing navigation systems.

In some implementations, navigation service 104 can segment portions of the route and determine lane connectivity and other properties of the segments to identify portions of the route that require additional guidance concerning e.g., lane position. In some implementations, the decision to provide additional guidance is based on one or more of a length of a lane in a road segment, a type of road segment, and/or a ratio of invalid lanes to valid lanes (or invalid lanes to total lanes) of the road segment. In addition to, or alternatively, system 100 can identify portions of the determined route that require additional guidance before the user begins traversing the route based on a user's estimated or projected position along the route.

In some implementations, navigation service 104 can provide additional guidance concerning maneuvers and different types of road configurations that are not based solely on lane position. Navigation service 104 can e.g., determine when a road contains two of the same type of turns that are closely spaced together (e.g., two right turns in a row), which could lead to an unintended maneuver, and insert additional guidance instructions to guide the user to the correct maneuver.

In some implementations, navigation service 104 will provide more or customized navigation instructions based on a location of the user device 130. For example, in some countries it is preferred to have continual or more frequent navigation instructions (e.g., once a minute or some other pre-determined time period) than what are typically presented by today's navigation systems.

Lane Guidance

Figure 2:
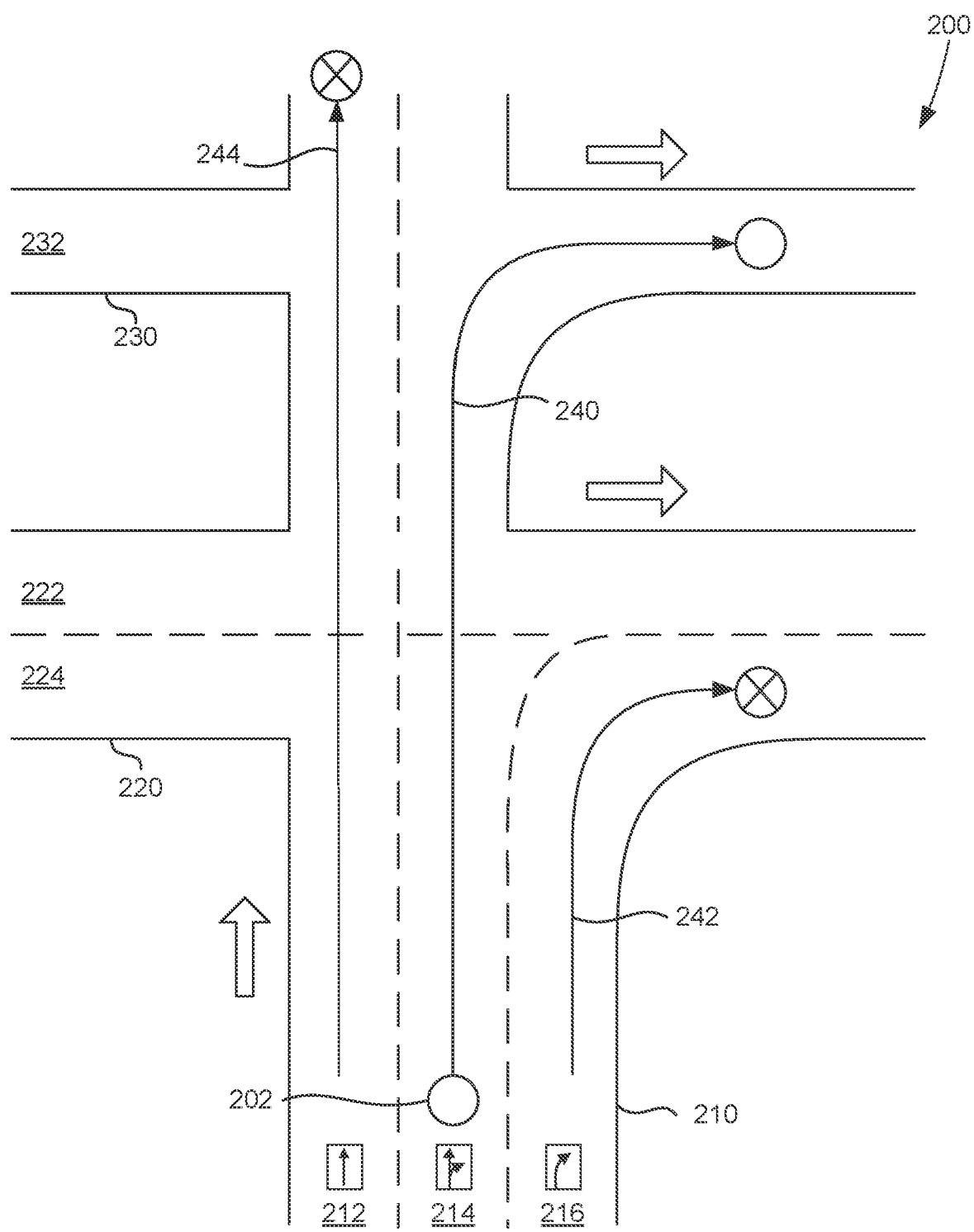
FIG. 2 is an example road configuration comprising a road that a user is traversing as part of a navigation route.

FIG. 2 illustrates an example road configuration 200 comprising first road 210 that user 202 is traversing as part of route 240. First road 210 has three lanes 212, 214 and 216 and is intersected by second road 220 having two lanes 222 and 224 and third road 230 having a single lane 232. In the illustrated example, each road 210, 220 and 230 is a one-way road for illustrative purposes only. In addition, lane 216 of first road 210 is a right-turn only designated lane, which turns into lane 224 of second road 220. Lane 214 is not a designated lane as it allows a turn onto lane 222 of second road 220 and a straight path past second road 220 towards third road 230. Lane 214 also allows a turn onto lane 232 of third road 230 and a straight path past third road 230. Lane 212 of first road 210 is designated for a straight path past second and third roads 220, 230.

In the illustrated example, user 202 is on a navigation route 240 that includes a right turn onto third road 230. Based on the designation of lane 216, user 202 must be in lanes 212 or 214 to reach third road 230. Otherwise, should user 202 be in lane 216 when it approaches second road 220, user 202 will be forced to make an unintended turn onto second road 220, putting user 202 on unintended route 242. Once past second road 220, user 202 needs to be in lane 214 to turn onto third road 230 as there is no access to third road 230 from lane 212. Should user 202 be in lane 212 when it approaches third road 230, user 202 will be forced to stay straight on first road 210, missing the turn for third road 230, putting user 202 on unintended route 244.

When user 202 is approaching the next maneuver in its intended route 240, the typical navigation program will provide directions such as "turn right in 250 feet" and typically begin a distance countdown alerting user 202 when to make the next maneuver. As noted above, however, if user 202 is in lane 216 when it approaches second road 220 or in lane 212 when it approaches third road 230, user 202 will be inadvertently forced off the intended route 240 and put on another route (i.e., route 242 or route 244). Thus, even though proper navigation instructions were provided, user 202 could still end up off-route.

In some implementations, navigation service 104 recognizes the potential for this and other inadvertent maneuvers while creating the navigational instructions for route 240 and prepares and inserts additional guidance instructions that if followed will keep user 202 on the correct route 240. That is, before sending the usual navigation instructions for traversing route 240, service 104 inserts additional guidance instructions, in this case a lane guidance instruction, forming an enhanced set of instructions for traversing route 240.

Figure 3:
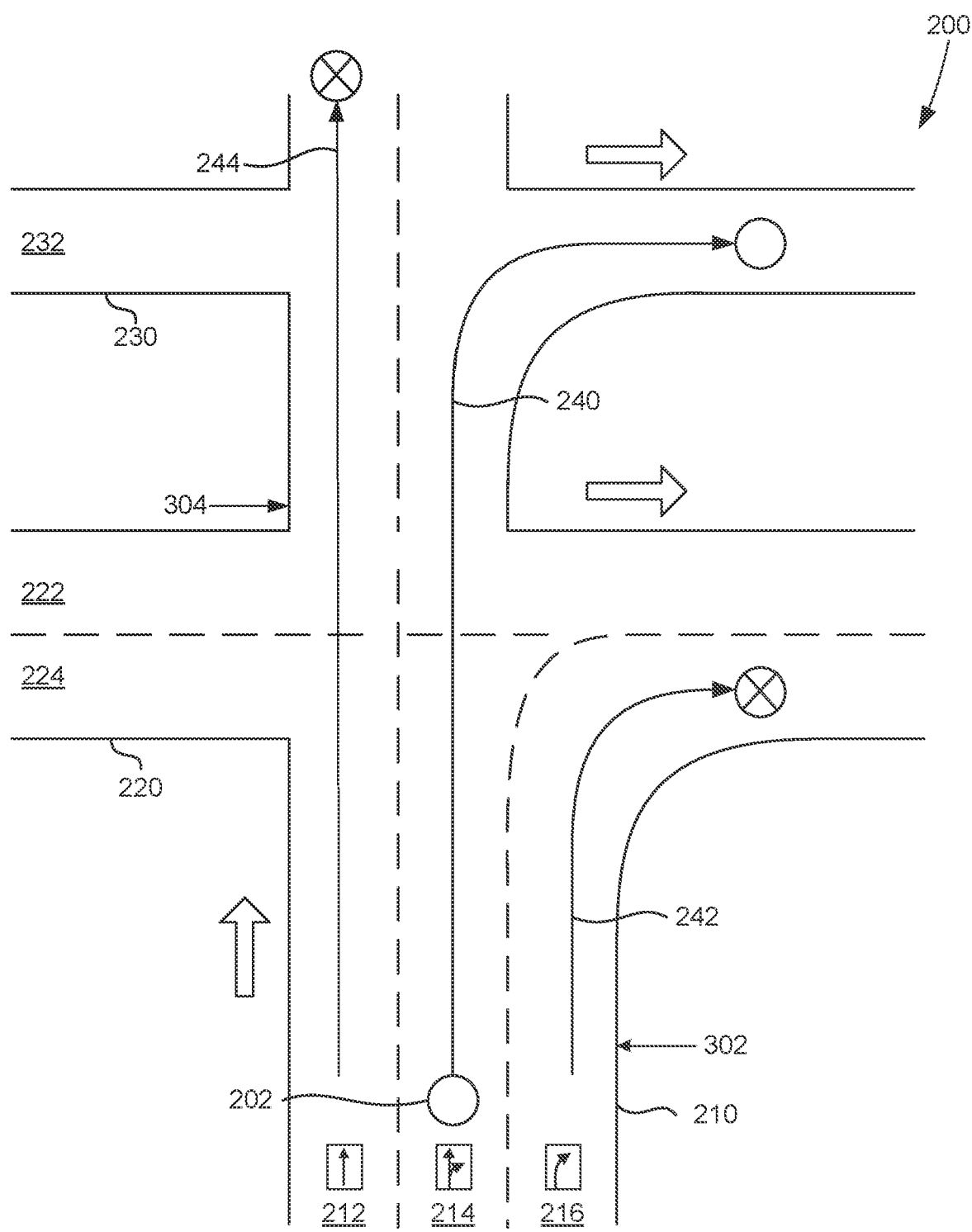
FIG. 3 illustrates the example road configuration of FIG. 2 with markers illustrating points along the route where the navigation service disclosed herein can insert one or more additional guidance instructions for the route.
Figure 3A:
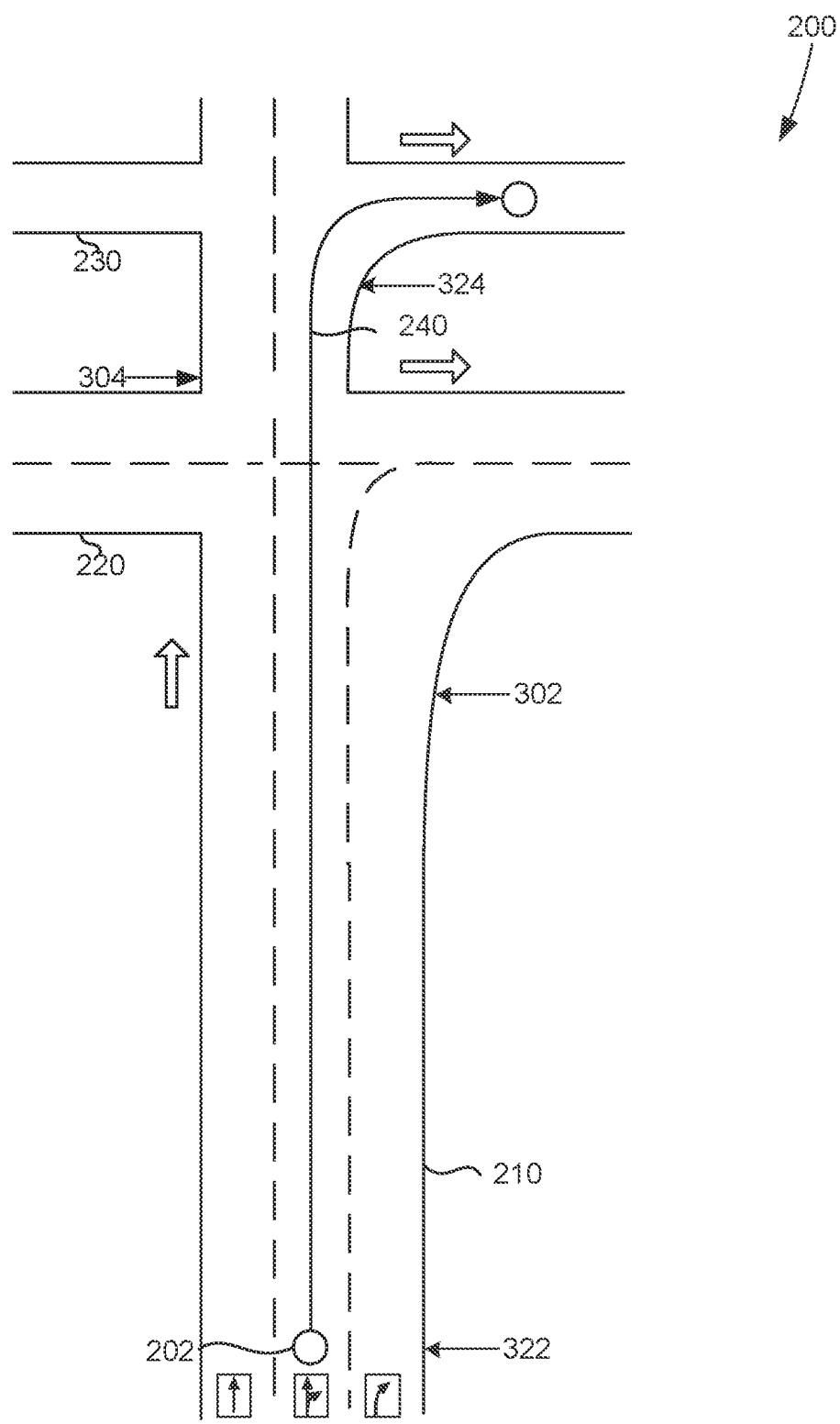
FIG. 3A illustrates a zoomed-out view of the example road configuration of FIG. 2 example road configuration with markers illustrating points along the route where the navigation service disclosed herein provides navigation instructions and markers illustrating points along the route where the navigation service disclosed herein can insert one or more additional guidance instructions for the route.

FIG. 3 illustrates the example road configuration 200 of FIG. 2 with markers 302 and 304 illustrating points along route 240 where navigation service 104 can insert one or more additional guidance instructions (e.g., lane guidance instructions) in between the traditional navigation instructions. Map application 132 would present the additional guidance instructions when user 202 approaches markers 302 and/or 304. FIG. 3A illustrates a zoomed-out view of example road configuration 200. In this view, markers 322 and 324 indicate where the traditional navigation instructions are provided when user 202 approaches markers 322 and 324. Markers 302 and 304 are therefore inserted at positions between markers 322 and 324 to provide additional guidance between the traditional navigation instructions. The additional guidance instruction at marker 302 could be a lane guidance instruction such as "stay in the two left lanes," "stay in the middle lane" or a combination thereof such as "stay in the two left lanes and move into the right lane after passing second road." The embodiments disclosed herein should not be limited to the exact wording of the additional guidance instruction. Indeed, any instruction that alerts the user as to the appropriate lane position is all that is required. Map application 132 can present the additional guidance instruction as an audible and/or visual instruction similar to or different than the navigation instructions.

In some implementations, the additional guidance instruction (e.g., lane guidance instruction) provided at marker 304 could be an instruction such as "move into the right lane" or a similar instruction guiding user 202 towards lane 214. The additional guidance instruction at marker 304 would not be required if the additional guidance instruction at marker 302 already alerted the user to be in lane 214 before reaching third road 230. However, there may be instances where user 202 would want the extra instruction at marker 304. For example, user 202 could change a setting in navigation application 132 such that the user receives more instructions than usual. In that case, navigation service 104 would insert additional guidance instructions at markers 302 and 304.

In some implementations, navigation service 104 uses a location of user 202 (via the location of user device 130) to determine if more or less instructions should be inserted into the navigation instructions for route 240. For example, it is known that users within certain countries desire continual instructions along a route, while users within other countries prefer less instructions. Navigation service 104 can determine where user device 130 is located and use a table indexed by user location to prepare the appropriate amount of instructions by default. For certain countries, the instructions can be more verbose and specific such as e.g., "get into the side road," "turn at the signal" and "do not turn here." As noted above, however, in some implementations user 202 can change the default setting using navigation application 132 such that user 202 receives more or less instructions and navigation service 104 would use the user setting to prepare the instructions for the route.

In some implementations, navigation service 104, using map data from database 106, provides the additional guidance instructions (e.g., lane guidance instructions) by segmenting the roads along route 240 and then determining lane connectivity and other properties of each segment to identify portions of route 240 that could cause user 202 to be forced off route 240 (e.g., by being in the improper lane). In some implementations, the decision to provide additional guidance is based on one or more of a length of a lane in a road segment, a type or class of road segment, and/or a ratio of invalid lanes to valid lanes (or invalid lanes to total lanes) of the road segment. As used herein, a valid lane is a lane allowing the upcoming maneuver (e.g., lane 214 is a valid lane for reaching third road 230) while an invalid lane is a lane in which the maneuver cannot be made (e.g., lane 216 is an invalid lane for going straight to reach third road 230). In some implementations, it is preferred to only provide the additional guidance when there is a high likelihood that user 202 could go off route. For example, all of the above factors can be weighted and combined to form a lane connectivity value, which can then be compared to a predetermined lane connectivity threshold. If the computed lane connectivity value is greater than the predetermined lane connectivity threshold, the additional guidance is required. In other implementations, or after service 104 determines that user 202 desires more instructions, additional guidance instructions are provided based on any likelihood that user 202 could go off route.

In some implementations, navigation service 104 applies different weights to the segment's length of lane (or lanes) based upon the type of road segment. Road segments are classified based on factors such as whether they are controlled access roads and their functional road class attribute in the map data. For example, roads can be classified as local, freeway/highway, and arterial, to name a few. The class or type of road can dictate the type of driving user 202 will experience and whether the lane length in the segment could cause user 202 to be in the wrong lane when a maneuver is approaching. Each type of road may have different speed limits and configurations that may also be considered when navigation service 104 judges lane length to determine if additional guidance instructions are required for a segment.

In some implementations, information about when a lane is formed can be included in the lane connectivity analysis. For example, a road segment may have a single lane for a majority of the segment until it reaches an intersection. Shortly before the intersection, a turning lane may be added to the segment. Since this turning lane was recently added on a road that the user was going straight one, the likelihood that this recently added lane would cause user 202 to be off route is very low. As such, navigation service 104 will apply a lower weight to recently formed lanes than a weight used for existing lanes.

In some implementations, the ratio of invalid lanes to valid lanes (or invalid lanes to total lanes) can be used in the determination to insert additional guidance instructions or not. For example, the higher the ratio of invalid lanes to valid or total lanes should mean that user 202 is likely to be in the wrong lane. In some implementations, the ratio of invalid lanes to valid lanes for a segment can be compared to a predetermined threshold and additional guidance instructions would be inserted if the threshold is exceeded.

In addition to, or alternatively, navigation service 104 can identify portions of the determined route 240 that require additional guidance based on user 202's estimated or predicted position along route 240 (even though navigation service 104 prepares the instructions for route 240 before user 202 begins traversing the route). For example, navigation service 104 can determine based on map data from database 106 and the segments within the map data when user 202 enters a road segment (e.g., from another maneuver) at a point where the new segment contains multiple lanes, one of which could quickly cause user 202 to make an unintended maneuver (e.g., if user 202 enters lane 216 just before lane 216 turns into second road 220). In this scenario, navigation service 104 could apply a different weight to the lane length or not use the lane length at all. That is, navigation service 104 can presume that user 202 is in the wrong lane based on its estimated position and insert an additional guidance instruction at marker 302, such as the instructions noted above.

The illustrated examples have been described as providing additional guidance instructions (e.g., lane guidance instruction) before a maneuver (e.g., a turn from one road to another). It should be appreciated, however, that unintended maneuvers can also occur on a stretch of road where no maneuver is required and where no navigation instruction would be issued. For example, often times there are gaps in navigation instructions after user 202 has been instructed to "go straight for X miles" or "take highway Y for 50 miles." A conventional map application would not issue the next instruction until this stretch of road has almost completely been traversed by user 202. Accordingly, user 202 would be unaware of any potential unintended maneuvers until it was too late.

Figure 4:
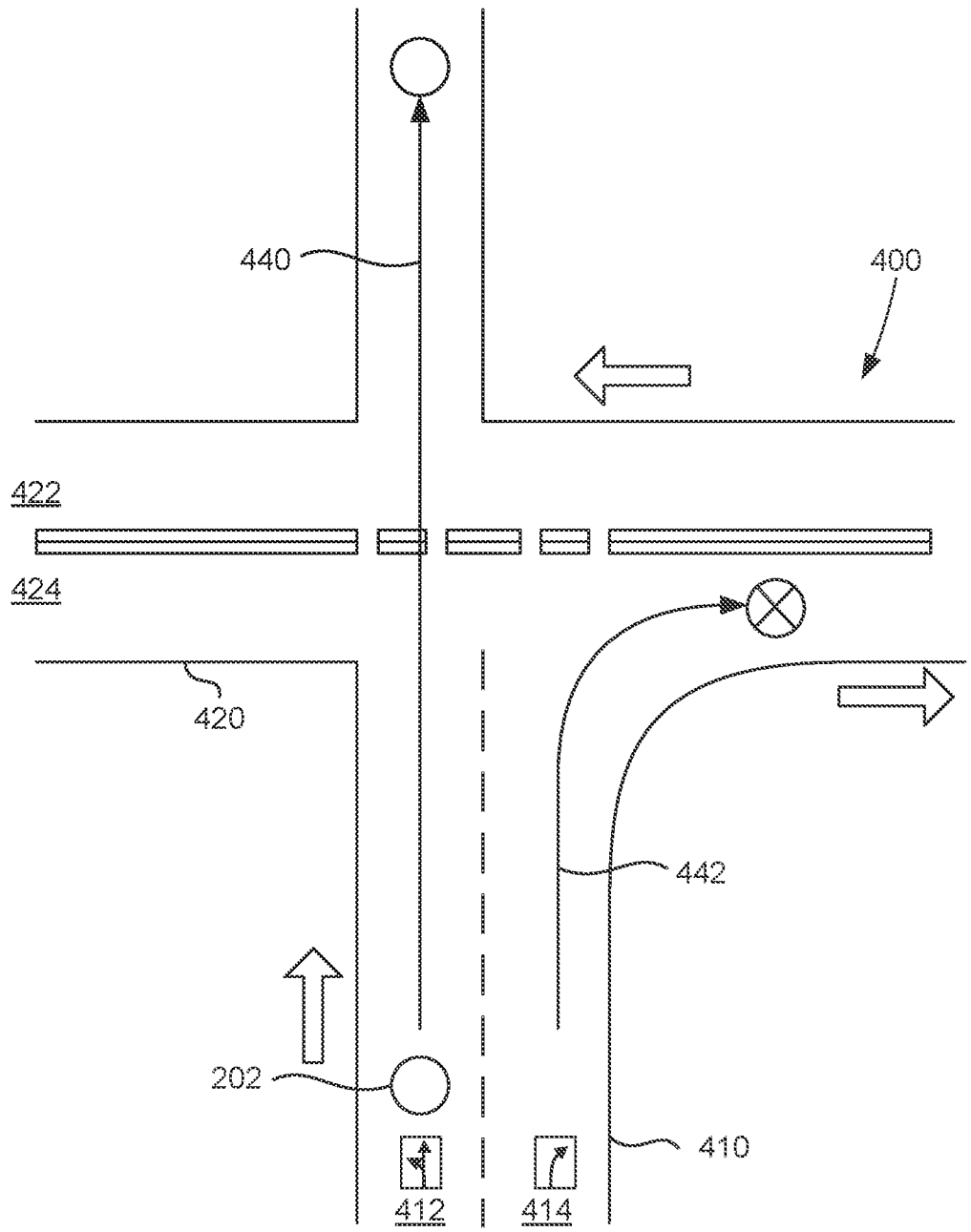
FIG. 4 is another example road configuration comprising a road that a user is traversing as part of a navigation route.

FIG. 4 illustrates an example road configuration 400 comprising first road 410 that user 202 is traversing as part of route 440. First road 410 has two lanes 412 and 414 and is intersected by second road 420 having two lanes 422 and 424. In the illustrated example, first road 410 is a one-way road and second road 420 is a bi-directional road comprising first lane 422 allowing traffic to move right-to-left and second lane 424 allowing traffic to move left-to-right. Lane 414 of first road 410 is a right-turn only designated lane, which turns into lane 424 of second road 420. Lane 414 also allows a left turn onto lane 422 of second road 420 and a straight path past second road 420.

In the illustrated example, user 202 is on navigation route 440 and has been previously instructed to stay on first road 402. That is, at some point user 202 was instructed by navigation application 132 to "stay on first road for X miles" or some other instruction that does not include a maneuver. Based on the designation of lane 414, user 202 must be in lane 412 when it reaches second road 420. Otherwise, should user 202 be in lane 414 when it approaches second road 420, user 202 will be forced to make an unintended turn onto second road 420, putting user 202 on unintended route 442. Thus, even though proper navigation instructions were provided, user 202 could still end up off-route.

In some implementations, to prevent this unintended maneuver, navigation service 104 recognizes the potential for this and other inadvertent maneuvers while creating the navigational instructions for route 440 and prepares and inserts additional guidance instructions (e.g., lane guidance instructions) that if followed will keep user 202 on the correct route 440. That is, before sending the usual navigation instructions for traversing route 440, service 104 inserts additional guidance instructions, in this case lane guidance instructions, forming an enhanced set of instructions for traversing route 440.

Figure 5:
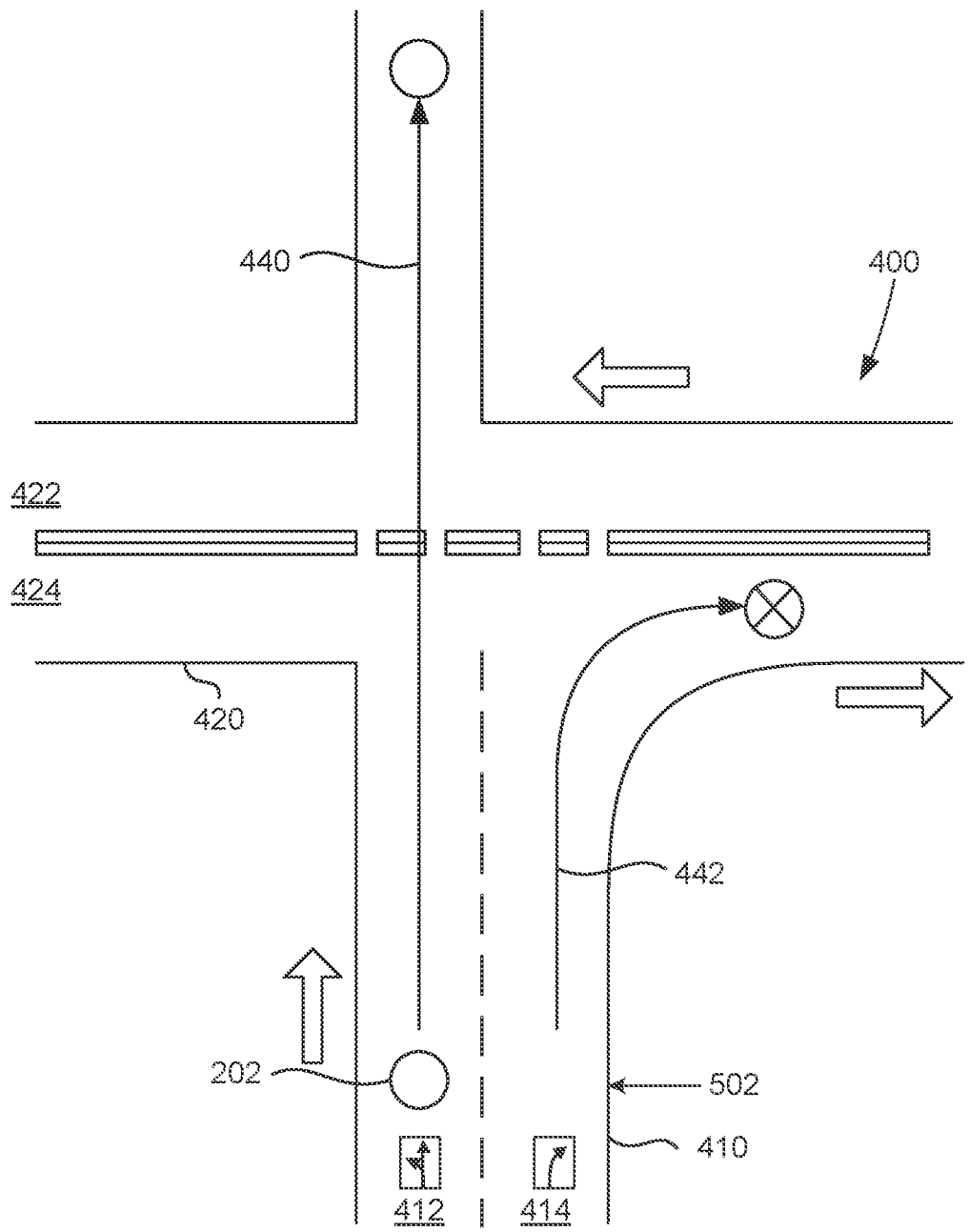
FIG. 5 illustrates the example road configuration of FIG. 4 with markers illustrating points along the route where the navigation service disclosed herein can insert one or more additional guidance instructions for the route.

FIG. 5 illustrates the example road configuration 400 of FIG. 4 with a marker 402 illustrating a point along route 440 where navigation service 104 can insert one or more additional guidance instructions (e.g., lane guidance instructions). Navigation service 102 can generate the additional guidance instruction in the same manner discussed above for road configuration 200. Map application 132 would present the additional guidance instruction when user 202 approaches marker 402. The additional guidance instruction at marker 402 could be a lane guidance instruction such as "stay in the left lane." The embodiments disclosed herein should not be limited to the exact wording of the additional guidance instruction. Indeed, any instruction that alerts the user as to the appropriate lane position is all that is required. Map application 132 can present the additional guidance instruction as an audible and/or visual instruction similar to or different than the navigation instructions.

In some implementations the determinations for issuing additional guidance instructions will take into account and be influenced by factors such as a position where the additional guidance occurs and/or road segment type, to name a few. Regarding the position where the additional guidance occurs, there can be maneuver guidance, which is additional guidance to assist in the completion of a maneuver (e.g., taking a freeway exit) and there can be midstep guidance, which is additional guidance to avoid an unintended maneuver (e.g., staying in the correct lane to avoid an unintended exit from the road).

In some embodiments, maneuver guidance is issued whenever there is lane information. For non-freeway road segments, the additional guidance instructions are timed e.g., to be shown after passing a previous intersection.

In some implementations, there can be three types of midstep guidance. The first type is categorized as additional guidance preceding the maneuver. The second type is categorized as additional guidance just after a maneuver. The third type is categorized as additional guidance that is not close to a maneuver.

Additional guidance preceding a maneuver is performed as follows. If it is determined that there is a lane geometry change within a predetermined distance of the upcoming maneuver that conflicts with the maneuver, then a midstep additional guidance instruction is issued. In some implementations, the predetermined distance is 1100 m for freeway road segments, 500 m for arterial road segments and 400 m for local road segments.

Additional guidance just after a maneuver is performed as follows. If it is determined that within a predetermined distance after completing a maneuver there is a chance that one of the lanes in which the user could end up in forces the user off-route, a midstep additional guidance instruction is issued. In some implementations, the predetermined distance is 500 m for freeway road segments. Other distances can be used for arterial road segments and local road segments.

Additional guidance that is not close to a maneuver is performed when it is determined that there is e.g., a lane geometry change that does not fall within the predetermined distance ranges of the guidance preceding a maneuver or the guidance after a maneuver. The decision to issue an additional guidance instruction can then be based on the length of the lane(s) that could force the user off-route. In some implementations, the minimum lane length is 1100 m for freeway road segments, 600 m for arterial road segments and 450 m for local road segments. A lane(s) less than this minimum will require the insertion of an additional guidance instruction. In some implementations, there is an additional criteria for freeways. This additional criteria can use uses a ratio of invalid lanes (i.e., lanes in which the upcoming maneuver cannot be performed) to total lanes and this ratio must equal to or greater than a predetermined ratio threshold for additional guidance instructions to be inserted. In some implementations, this threshold can be a ratio of 2:5.

Smart Guidance

Unintended maneuvers that are not based on lane position can also occur. For example, when a road contains two of the same type of turns that are closely spaced together (e.g., two right turns in a row), the user may simply misinterpret the navigation instruction provided by the navigation application and turn onto the wrong road (e.g., the user turns too early or too late). It is desirable to provide additional guidance instructions for these situations as well.

Figure 6:
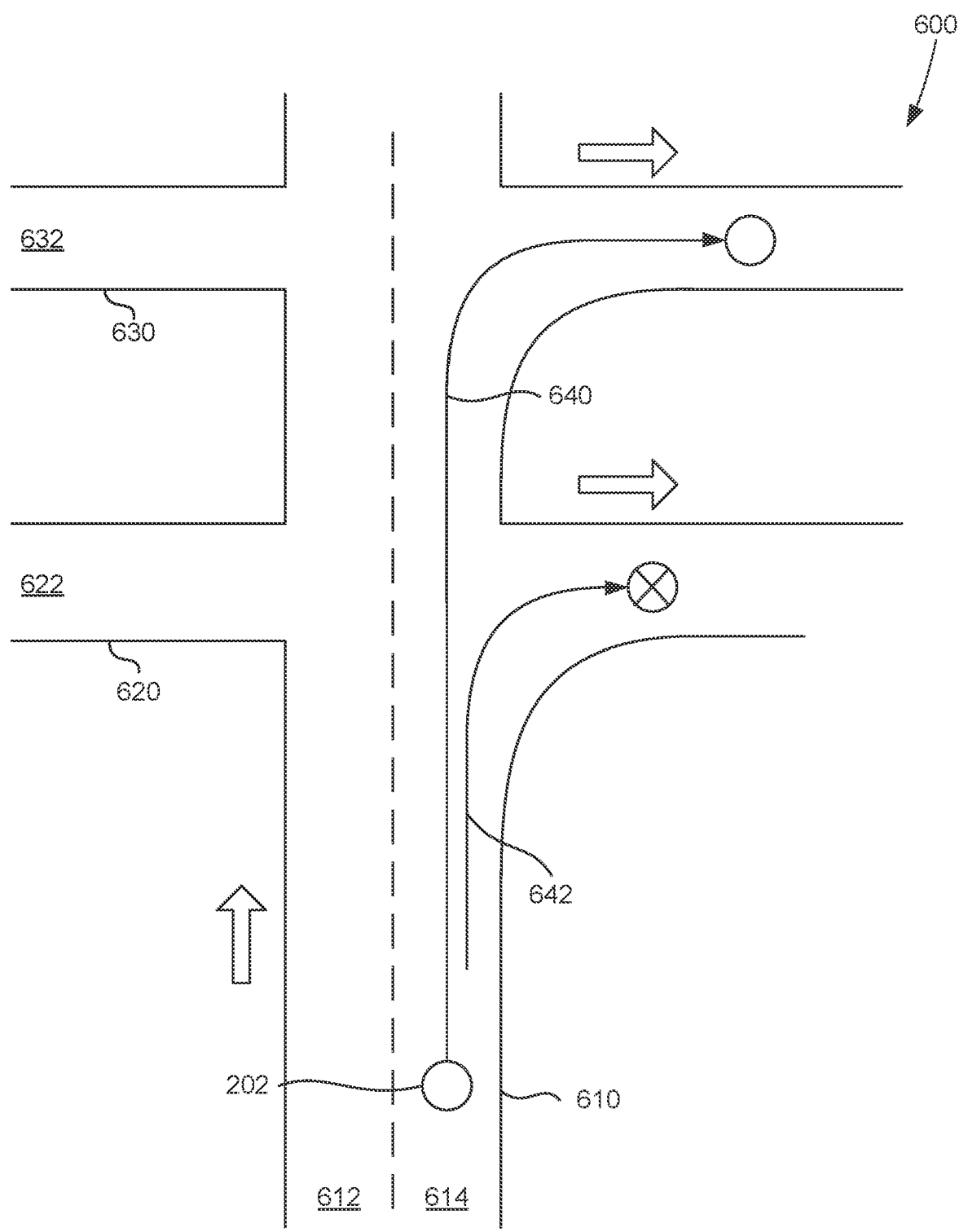
FIG. 6 is another example road configuration comprising a road that a user is traversing as part of a navigation route.

FIG. 6 illustrates an example road configuration 600 comprising first road 610 that user 202 is traversing as part of route 640. First road 610 has two lanes 612 and 614 and is intersected by second road 620 having one lane 622 and third road 630 having lane 632. In the illustrated example, each road 610, 620 and 630 is a one-way road for example purposes only. In the illustrated example, second road 620 is spaced in a close proximity to third road 630. If the last navigation instruction was e.g., "turn right in 250 feet" and user 202 is not paying attention, is not familiar with road configuration 600, or is confused by the close proximity of second road 620 and third road 630, user 202 could turn too early and turn onto lane 622 of second road 620 putting user 202 on unintended route 642. Thus, even though proper navigation instructions were provided, user 202 could still end up off-route.

In some implementations, to prevent this unintended maneuver, navigation service 104 recognizes the potential for this and other inadvertent maneuvers while creating the navigational instructions for route 640 and prepares and inserts additional guidance instructions that if followed will keep user 202 on the correct route 640. That is, before sending the usual navigation instructions for traversing route 640, navigation service 104 inserts additional guidance instructions, in this case a smart guidance instruction, forming an enhanced set of instructions for traversing route 640.

As used herein, a "smart guidance instruction" is an instruction that positions the user by any manner other than lane position. For example, a smart guidance instruction could be an instruction to make a maneuver at a certain point (e.g., "make the second right"), skip a potential maneuver (e.g., "pass second road") or continue on a path (e.g., "stay straight"), to name a few.

Figure 7:
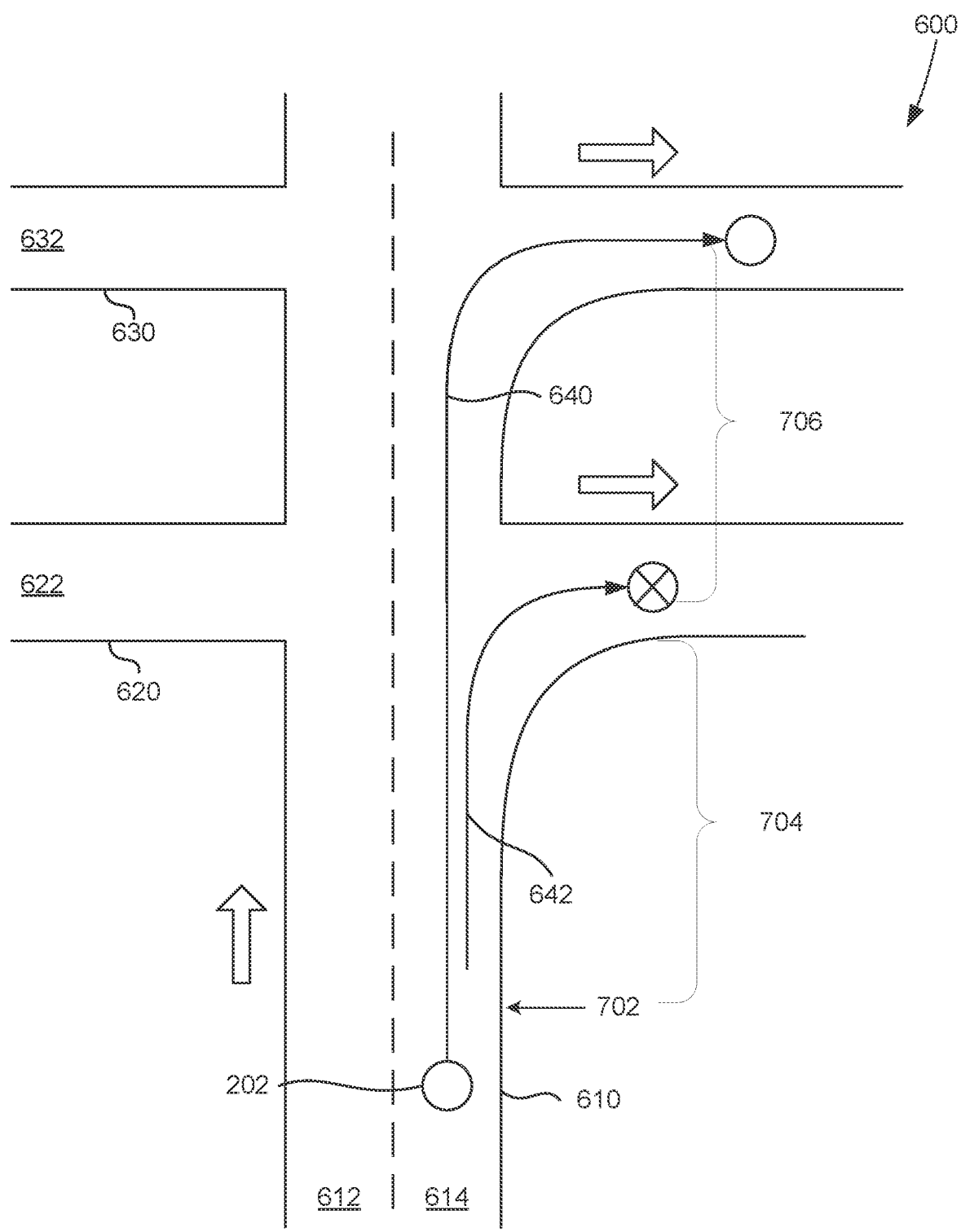
FIG. 7 illustrates the example road configuration of FIG. 6 with markers illustrating points along the route where the navigation service disclosed herein can insert one or more additional guidance instructions for the route.

FIG. 7 illustrates the example road configuration 600 of FIG. 6 with marker 702 illustrating a point along route 640 where navigation service 104 can insert one or more additional guidance instructions (e.g., smart guidance instructions). Map application 132 would present an additional guidance instruction when user 202 approaches marker 702. The additional guidance instruction at marker 702 could be a smart guidance instruction such as "pass second road" or "make the second right." The embodiments disclosed herein should not be limited to the exact wording of the additional guidance instruction. Indeed, any instruction that alerts user 202 to make the correct turn (or to pass the wrong turn) is all that is required. Map application 132 can present the additional guidance instruction (e.g., smart guidance instruction) as an audible and/or visual instruction similar to or different than the navigation instructions.

In some implementations the smart guidance instruction is inserted at a preferred distance 704 before second road 620 to ensure that user 202 has enough time to digest the instruction and assess the situation. In some implementations, navigation service 104 can determine distance 706 between second road 620 and third road 630. If distance 706 is less than a predefined threshold distance, navigation service 104 can insert the smart guidance instruction into the navigation instructions for route 640.

In addition to, or alternatively, navigation service 104 may determine whether third road 630 is within a specified distance of an intersection and if that distance is less than a predetermined threshold, navigation service 104 can insert the smart guidance instruction into the navigation instructions for route 640. The instruction could be one to keep 202 on its current path (e.g., "stay straight at the intersection," "pass the intersection").

Figure 8:
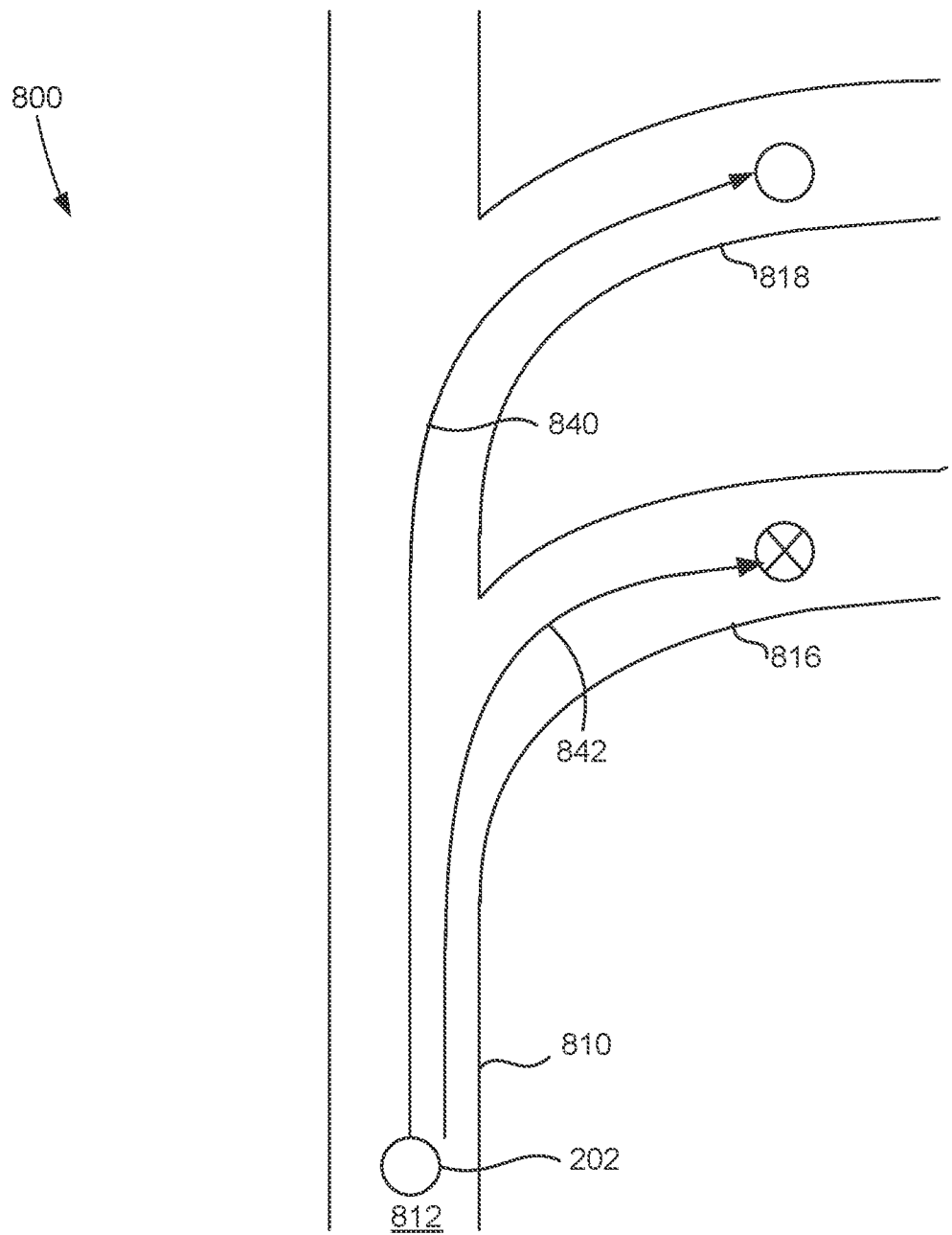
FIG. 8 is another example road configuration comprising a road that a user is traversing as part of a navigation route.

FIG. 8 illustrates an example road configuration 800 comprising first road 810 that user 202 is traversing as part of route 440. First road 810 has a single lane 812 that leads to first exit ramp 816 and second exit ramp 818. In the illustrated example, second exit ramp 818 is part of intended route 840 while first exit ramp 816 is not. In the illustrated example, second exit ramp 818 is spaced in a close proximity to first exit ramp 816. If the last navigation instruction was e.g., "turn right in 250 feet" or "exit in 250 feet" and user 202 is not paying attention, or is confused by the close proximity of first exit ramp 816 and second exit ramp 818, user 202 could turn too early and get off at first exit ramp 816, putting user 202 on unintended route 842. Thus, even though proper navigation instructions were provided, user 202 could still end up off-route.

In some implementations, to prevent this unintended maneuver, navigation service 104 recognizes the potential for this and other inadvertent maneuvers while creating the navigational instructions for route 840 and prepares and inserts additional guidance instructions that if followed will keep user 202 on the correct route 840. That is, before sending the usual navigation instructions for traversing route 840, navigation service 104 inserts additional guidance instructions, in this case a smart guidance instruction, forming an enhanced set of instructions for traversing route 840.

Figure 9:
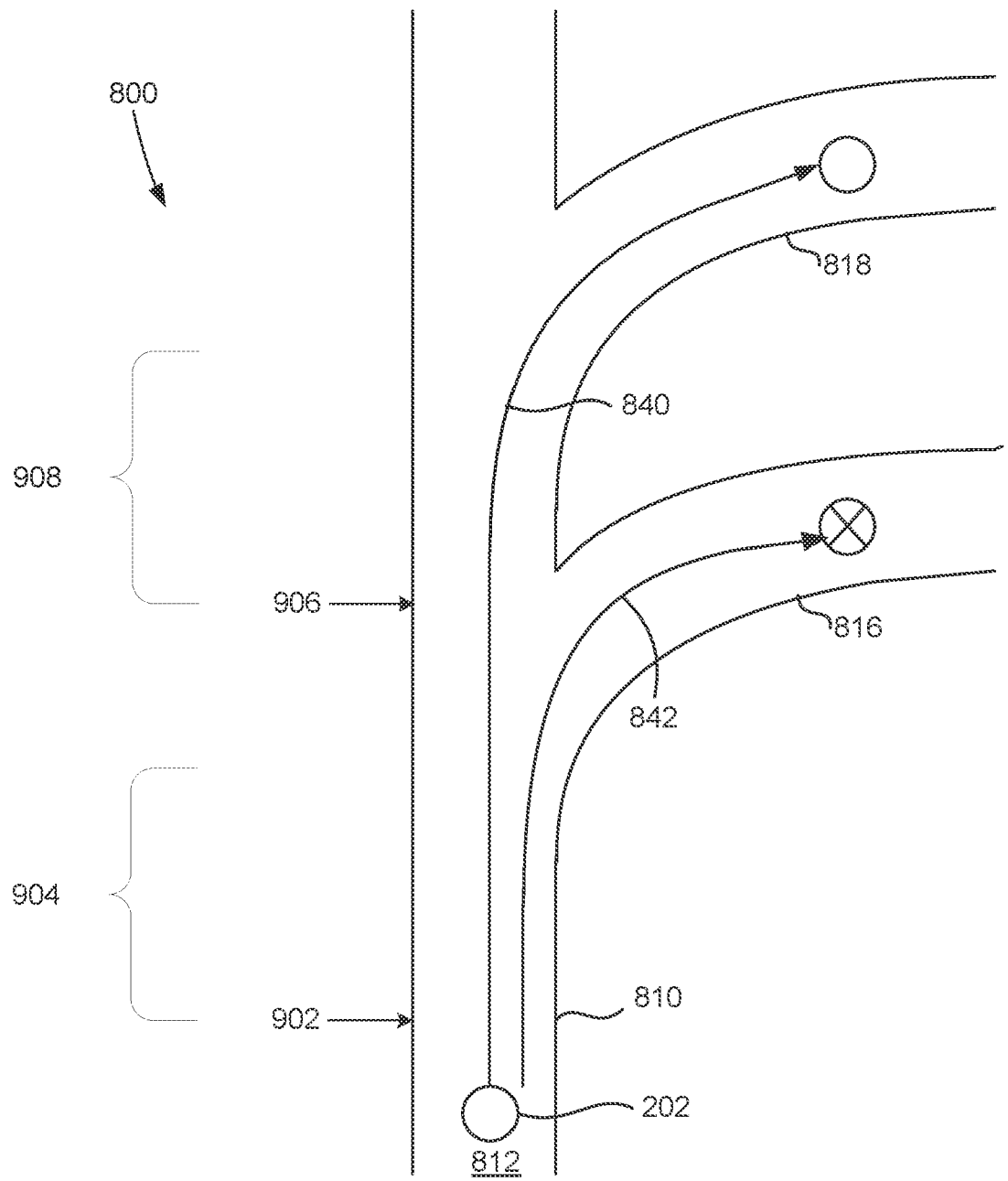
FIG. 9 illustrates the example road configuration of FIG. 8 with markers illustrating points along the route where the navigation service disclosed herein can insert one or more additional guidance instructions for the route.

FIG. 9 illustrates the example road configuration 800 of FIG. 8 with markers 902 and 906 illustrating points along route 840 where navigation service 104 can insert one or more additional guidance instructions (e.g., smart guidance instructions). Map application 132 would present the additional guidance instructions when user 202 approaches markers 902 and 906. The additional guidance instruction at marker 902 could be a smart guidance instruction such as "take the second exit" or "pass the next exit." The additional guidance instruction at marker 906 could be a smart guidance instruction such as "take the next exit."

One additional guidance instruction at marker 902 could be used if road configuration 800 is not complex or when user 202 only wants to receive a minimum amount of instructions (as discussed above). However, there may be situations where road configuration 800 is complex or user 202 wants additional guidance instructions (e.g., as dictated by a user setting or the location of user 202). For example, the country that user 202 is located in can be used to index e.g., a lookup table or data structure that provides an indication of the frequency, amount and/or type of instructions a user from that country prefers. Should user 202 be located in a country requiring more instructions, or is on a complex road configuration, navigation service 104 can insert an additional guidance instruction at marker 906.

The embodiments disclosed herein should not be limited to the exact wording of the additional guidance instructions. Indeed, any instruction that alerts user 202 to choose the correct exit (or to pass the wrong exit) is all that is required. Map application 132 can present the additional guidance instruction (e.g., smart guidance instruction) as an audible and/or visual instruction similar to or different than the navigation instructions.

In some implementations the smart guidance instruction for marker 902 is inserted at a preferred distance 904 before first exit 816 to ensure that user 202 has enough time to digest the instruction and assess the situation. Likewise, the smart guidance instruction for marker 906 is inserted at a preferred distance 908 before first exit 816 to ensure that user 202 has enough time to digest the instruction and assess the situation. Navigation service 104 may use any technique discussed above to determine if and where to insert smart guidance instructions into the navigation instructions for route 840.

Sometimes a navigation instruction may refer to a road by its name and its compass direction. For example, a navigation application may present an instruction that says "turn right onto 237 South." Often times, however, the target road (i.e., 237 South) has lanes going in the opposite direction (i.e., 237 North) that can also be accessed by a turn in the same direction (e.g., by an off-ramp). These other lanes will also intersect the road the user is traversing and present yet another instance where the user can go off route by making an unintended maneuver, particularly when he/she is unfamiliar with the target road.

Figure 10:
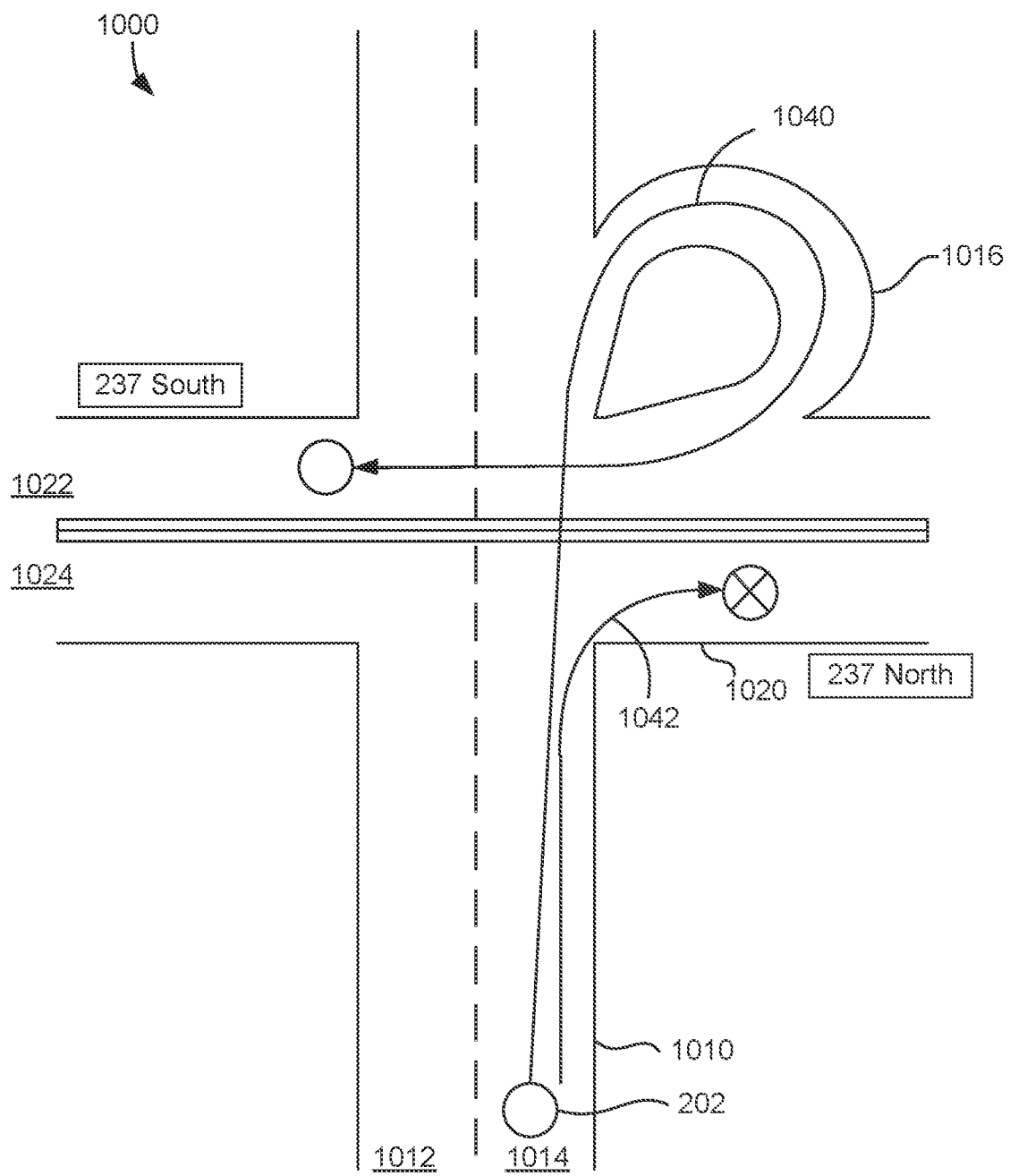
FIG. 10 is another example road configuration comprising a road that a user is traversing as part of a navigation route.

FIG. 10 illustrates an example road configuration 1000 comprising first road 1010 that user 202 is traversing as part of route 1040. First road 1010 has two lanes 1012 and 1014 and is intersected by second road 1020 having first lane 1022 heading south and second lane 1024 heading north, for example. Access to lane 1024 is made by a right turn from lane 1014 of first road 1010. In the illustrated example, however, access to lane 1022 is also achieved by a right turn from lane 1014 of first road 1010 via off-ramp 1016 or other type of road structure (e.g., overpass, underpass, roundabout). If the last navigation instruction was e.g., "turn right onto 237 South" and user 202 is not paying attention or is not familiar with road configuration 1000, user 202 could turn too early and turn onto lane 1024, putting user 202 on unintended route 1042 heading in the exact opposite direction of route 1040. This is yet another instance were a proper navigation instruction was provided, yet user 202 could still end up off-route.

In some implementations, to prevent this unintended maneuver, navigation service 104 recognizes the potential for this and other inadvertent maneuvers while creating the navigational instructions for route 1040 and prepares and inserts additional guidance instructions that if followed will keep user 202 on the correct route 1040. That is, before sending the usual navigation instructions for traversing route 1040, navigation service 104 inserts additional guidance instructions, in this case a smart guidance instruction, forming an enhanced set of instructions for traversing route 1040.

Figure 11:
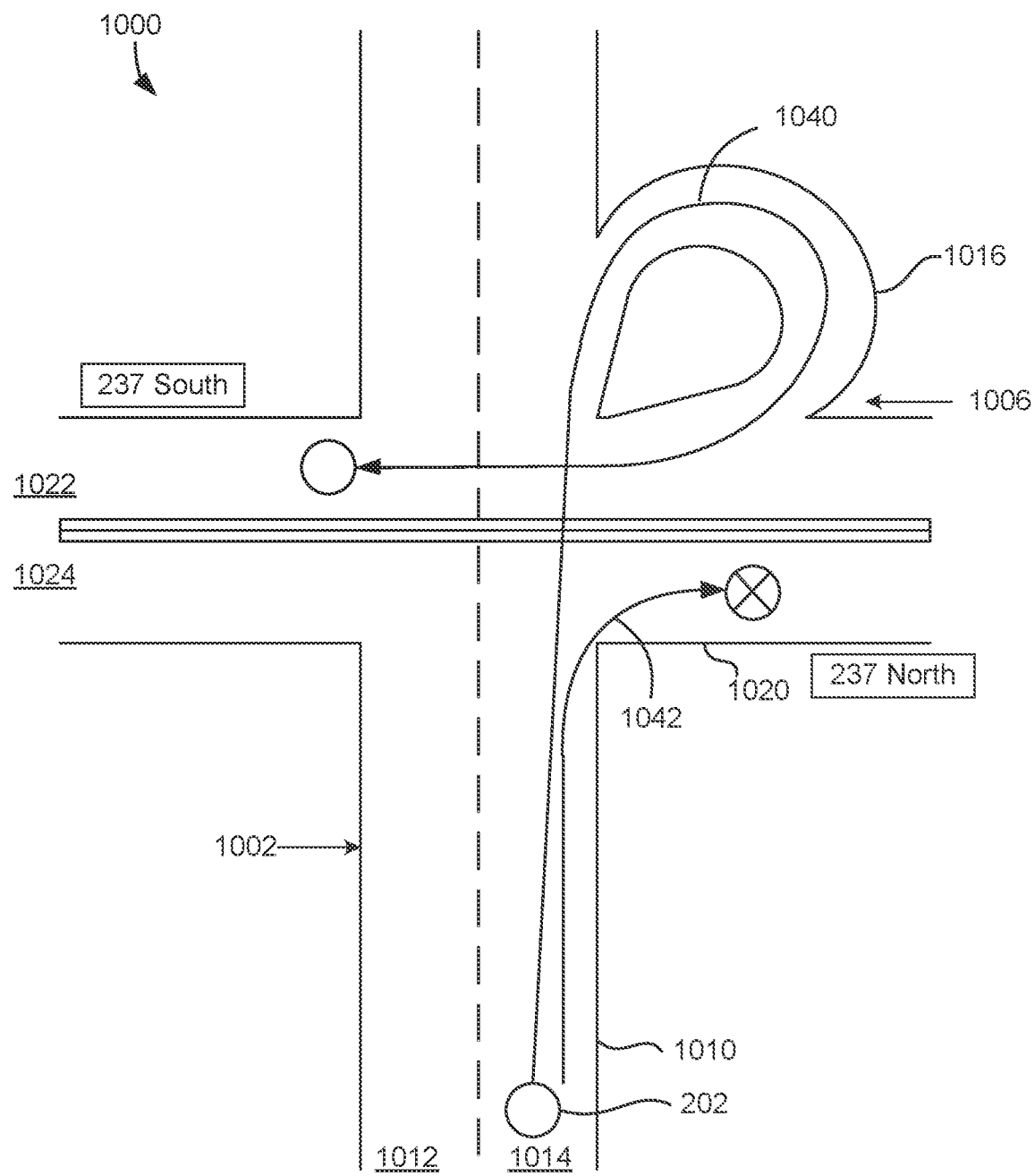
FIG. 11 illustrates the example road configuration of FIG. 10 with markers illustrating points along the route where the navigation service disclosed herein can insert one or more additional guidance instructions for the route.

FIG. 11 illustrates the example road configuration 1000 of FIG. 10 with markers 1102 and 1106 illustrating points along route 1040 where navigation service 104 can insert one or more additional guidance instructions (e.g., smart guidance instructions). Map application 132 would present the additional guidance instructions when user 202 approaches markers 1102 and 1106. The additional guidance instruction at marker 1102 could be a smart guidance instruction such as "take the second right" or "go through the intersection." The additional guidance instruction at marker 1106 could be a smart guidance instruction such as "make the next right" or "take the exit ramp."

The embodiments disclosed herein should not be limited to the exact wording of the additional guidance instructions. Indeed, any instruction that alerts user 202 to choose the correct turn (or to pass the wrong turn) is all that is required. Map application 132 can present the additional guidance instruction (e.g., smart guidance instruction) as an audible and/or visual instruction similar to or different than the navigation instructions.

Example Processes

Each of the processes described below describe specific steps performed in a specific order. However, a skilled person will easily recognize that these processes can be performed with a greater or lesser number of steps. A skilled person would also recognize that some of the steps of these methods can be rearranged and/or performed in a different order while still producing the same or similar results. Moreover, one or more of these methods and/or method steps may be combined with other methods to perform the operations and/or provide the features described herein.

Figure 12:
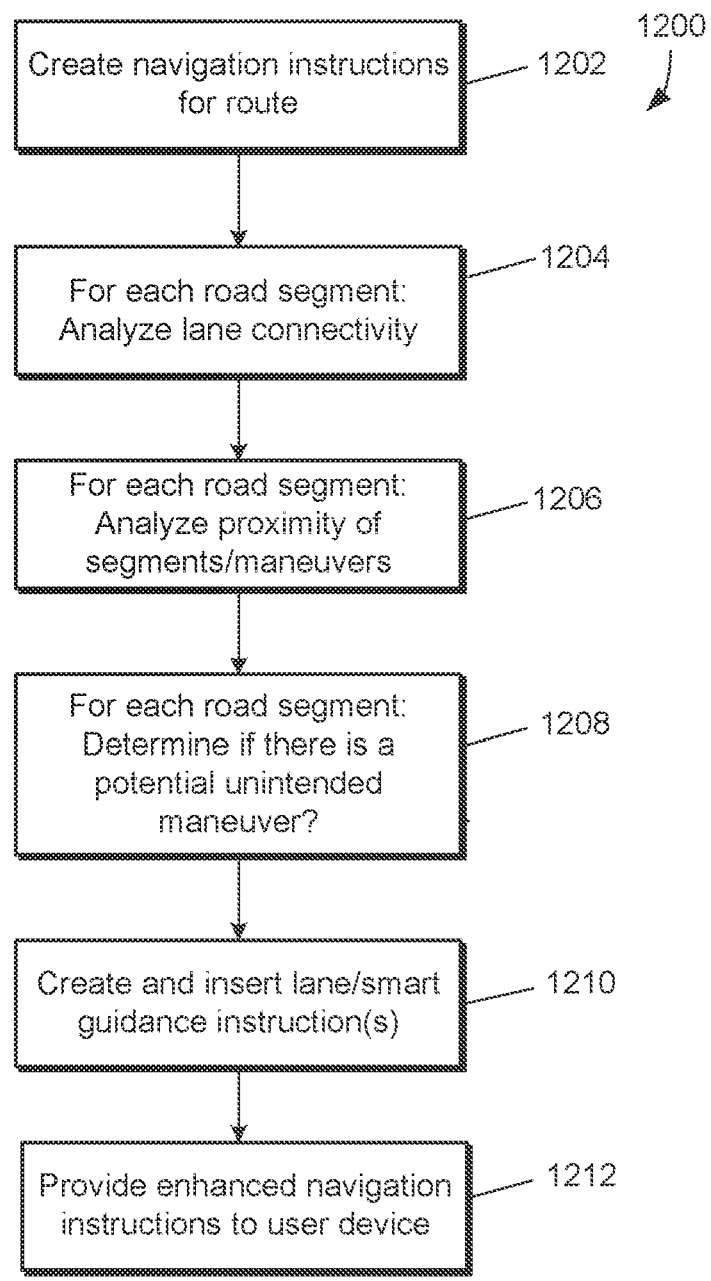
FIG. 12 is a flow diagram of an example process for providing additional guidance (e.g., via lane and smart guidance instructions) in a navigation route in accordance with the disclosed principles.

FIG. 12 is flow diagram of an example process 1200 for providing additional guidance (e.g., via lane and smart guidance instructions) between navigation maneuvers in a navigation route in accordance with the disclosed principles. For example, process 1200 can be performed by navigation service 104 running on server device 102.

At step 1202, navigation service 104 can obtain map data from database 106 and create navigation instructions for a route requested by navigation application 132 on user device 130. The route will have a starting point and a destination and navigation service 104, using map data from database 106, will generate a series of navigation instructions for traversing the route.

At step 1204, navigation service 104 using map data from database 106 will analyze lane connectivity for each road segment along the route. Lane connectivity can be used to generate lane guidance instructions. Lane connectivity can be determined by any of the examples noted above. For example, lane connectivity can be analyzed based on one or more of a length of a lane in a road segment, a type or class of road segment, and/or a ratio of invalid lanes to valid lanes (or invalid lanes to total lanes) of the road segment. In some implementations, navigation service 104 applies different weights to the segment's length of lane (or lanes) based upon the type of road segment. In some implementations, information about when a lane is formed can be included in the lane connectivity analysis. In addition to, or alternatively, the analysis performed at step 1204 can identify the user's estimated or predicted position along route and incorporate this position into the analysis.

At step 1206, navigation service 104 using map data from database 106 will analyze the proximity of segments and/or maneuvers for each road segment along the route. This analysis can be used to determine smart guidance instructions by any of the examples noted above. For example, navigation service 104 can determine distances between two road segments or turn-offs in this analysis. In addition to, or alternatively, navigation service may also determine whether a road segment is within a predetermined distance from an intersection in the analysis performed at step 1204.

At step 1208, navigation service 104 uses the analyses performed in steps 1204 and 1206 to determine, for each road segment, whether there is the potential for an unintended maneuver along the route. That is, as discussed above, navigation service 104 can determine whether an unintended maneuver is possible because of the user's likelihood of being in the wrong lane based on the lane connectivity analysis of step 1204. In addition, navigation service 104 can determine whether an unintended maneuver is possible because of e.g., the user makes a wrong turn or chooses the wrong exit from a road based on the proximity analysis of step 1206.

As step 1210, navigation service 104 inserts the additional guidance instructions (e.g., lane guidance instructions and/or smart guidance instructions) into the original navigation instructions for the route. The instructions additional guidance instructions are inserted such that the instructions are presented at a marker such as markers 302 and 304 of FIG. 3, marker 502 of FIG. 5, marker 702 of FIG. 7, markers 902 and 906 of FIG. 9, and markers 1002 and 1006 of FIG. 11.

At step 1212, the enhanced navigation instructions are provided to user device 130. For example, the enhanced navigation instructions may be transmitted by navigation service 104 from server device 102 to user device 130 via network connection 120. Once on user device 130, navigation application 132 can present the enhanced navigation instructions as the user traverses the route.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 13:
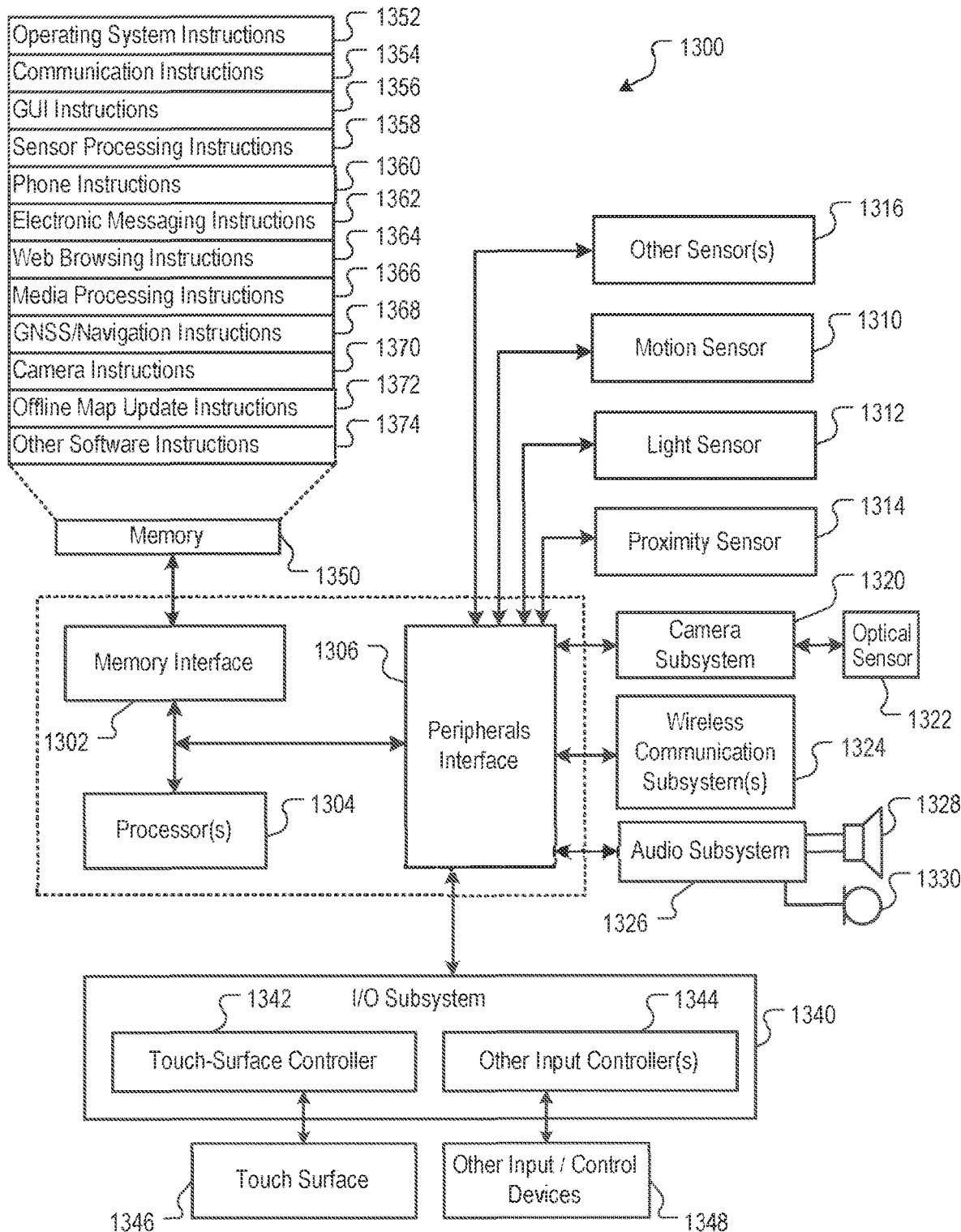
FIG. 13 is a block diagram of an exemplary system architecture implementing the features and processes of FIGS. 1-12.

FIG. 13 is a block diagram of an example computing device 1300 that can implement the features and processes of FIGS. 1-12. The computing device 1300 can include a memory interface 1302, one or more data processors, image processors and/or central processing units 1304, and a peripherals interface 1306. The memory interface 1302, the one or more processors 1304 and/or the peripherals interface 1306 can be separate components or can be integrated in one or more integrated circuits. The various components in the computing device 1300 can be coupled by one or more communication buses or signal lines.

Sensors, devices, and subsystems can be coupled to the peripherals interface 1306 to facilitate multiple functionalities. For example, a motion sensor 1310, a light sensor 1312, and a proximity sensor 1314 can be coupled to the peripherals interface 1306 to facilitate orientation, lighting, and proximity functions. Other sensors 1316 can also be connected to the peripherals interface 1306, such as a global navigation satellite system (GNSS) (e.g., GPS receiver), a temperature sensor, a biometric sensor, magnetometer or other sensing device, to facilitate related functionalities.

A camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips. The camera subsystem 1320 and the optical sensor 1322 can be used to collect images of a user to be used during authentication of a user, e.g., by performing facial recognition analysis.

Communication functions can be facilitated through one or more wireless communication subsystems 1324, which can include radio frequency receivers and transmitters and/or optical (e.g., infrared) receivers and transmitters. The specific design and implementation of the communication subsystem 1324 can depend on the communication network(s) over which the computing device 1300 is intended to operate. For example, the computing device 1300 can include communication subsystems 1324 designed to operate over a GSM network, a GPRS network, an EDGE network, a Wi-Fi or WiMax network, and a Bluetooth™ network. In particular, the wireless communication subsystems 1324 can include hosting protocols such that the device 1300 can be configured as a base station for other wireless devices.

An audio subsystem 1326 can be coupled to a speaker 1328 and a microphone 1330 to facilitate voice-enabled functions, such as speaker recognition, voice replication, digital recording, and telephony functions. The audio subsystem 1326 can be configured to facilitate processing voice commands, voiceprinting and voice authentication, for example.

The I/O subsystem 1340 can include a touch-surface controller 1342 and/or other input controller(s) 1344. The touch-surface controller 1342 can be coupled to a touch surface 1346. The touch surface 1346 and touch-surface controller 1342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1346.

The other input controller(s) 1344 can be coupled to other input/control devices 1348, such as one or more buttons, rocker switches, thumb-wheel, infrared port, USB port, and/or a pointer device such as a stylus. The one or more buttons (not shown) can include an up/down button for volume control of the speaker 1328 and/or the microphone 1330.

In one implementation, a pressing of the button for a first duration can disengage a lock of the touch surface 1346; and a pressing of the button for a second duration that is longer than the first duration can turn power to the computing device 1300 on or off. Pressing the button for a third duration can activate a voice control, or voice command, module that enables the user to speak commands into the microphone 1330 to cause the device to execute the spoken command. The user can customize a functionality of one or more of the buttons. The touch surface 1346 can, for example, also be used to implement virtual or soft buttons and/or a keyboard.

In some implementations, the computing device 1300 can present recorded audio and/or video files, such as MP3, AAC, and MPEG files. In some implementations, the computing device 1300 can include the functionality of an MP3 player, such as an iPod™. The computing device 1300 can, therefore, include a 36-pin connector that is compatible with the iPod. Other input/output and control devices can also be used.

The memory interface 1302 can be coupled to memory 1350. The memory 1350 can include high-speed random access memory and/or non-volatile memory, such as one or more magnetic disk storage devices, one or more optical storage devices, and/or flash memory (e.g., NAND, NOR). The memory 1350 can store an operating system 1352, such as Darwin, RTXC, LINUX, UNIX, OS X, WINDOWS, or an embedded operating system such as VxWorks.

The operating system 1352 can include instructions for handling basic system services and for performing hardware dependent tasks. In some implementations, the operating system 1352 can be a kernel (e.g., UNIX kernel). In some implementations, the operating system 1352 can include instructions for performing voice authentication. For example, operating system 1352 can implement the offline map data update features as described with reference to FIGS. 1-12.

The memory 1350 can also store communication instructions 1354 to facilitate communicating with one or more additional devices, one or more computers and/or one or more servers. The memory 1350 can include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GNSS/Navigation instructions 1368 to facilitate GNSS and navigation-related processes and instructions; and/or camera instructions 1370 to facilitate camera-related processes and functions.

The memory 1350 can store other software instructions 1372 to facilitate other processes and functions, such as the offline map data update processes and functions as described with reference to FIGS. 1-12.

The memory 1350 can also store other software instructions 1374, such as web video instructions to facilitate web video-related processes and functions; and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1350 can include additional instructions or fewer instructions. Furthermore, various functions of the computing device 1300 can be implemented in hardware and/or in software, including in one or more signal processing and/or application specific integrated circuits.

Example Graphical User Interface

As described above, navigation service 104 determines and inserts additional guidance instructions into the navigations instructions for a route the user of user device 130 will traverse. Navigation application 132 will present these instructions on a display of user device 130. In some embodiments, navigation application 132 will present the instructions in a graphical user interface that includes text for the navigational and additional guidance instructions as well as lane and maneuver guidance graphics and inline shields representing the road being traversed. All of this information provides additional guidance to the user to help the user stay on-route.

Figure 14:
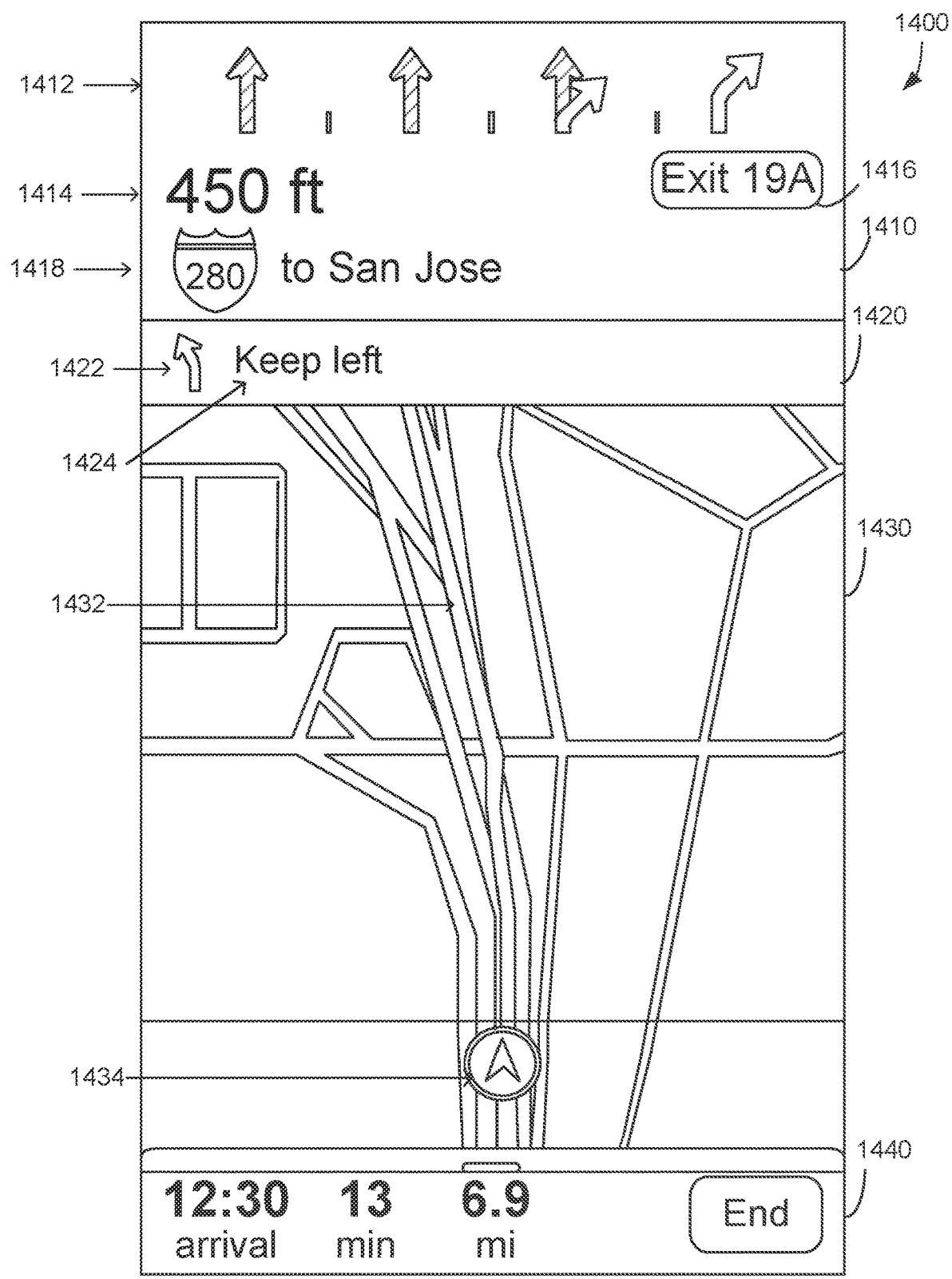
FIG. 14 is an example graphical user interface providing additional guidance in accordance with the disclosed principles.

FIG. 14 illustrates an example graphical user interface (GUI) 1400 that can be presented by navigation application 132 on a display of user device 130. GUI 1400 includes first display area 1410 comprising lane identifiers 1412, distance to the maneuver 1414, an identifier 1416, and a shield 1418 representing the typical road sign uses for the road the user is on. In the illustrated example, lanes associated with exiting the road are emphasized (e.g., highlighted) or shown in one color in lane identifiers 1412, while the other lanes are deemphasized (e.g., greyed-out) or shown in a second color in lane identifiers 1412.

In this example, the user's route is not supposed to exit the road. Accordingly, GUI 1400 includes second display area 1420 containing graphic 1422 and text 1424 for an additional guidance instruction (i.e., "stay left"). Graphic 1422 and text 1424 guide the user to "stay left" in this example.

GUI 1400 also includes third display area 1430 with a graphical representation 1432 of the user's route. The user's position is shown by indicator 1434. GUI 1400 also includes fourth display area 1440 providing overall route information (arrival time, time to arrival, distance) and a selector for ending the navigation.

Figure 15:
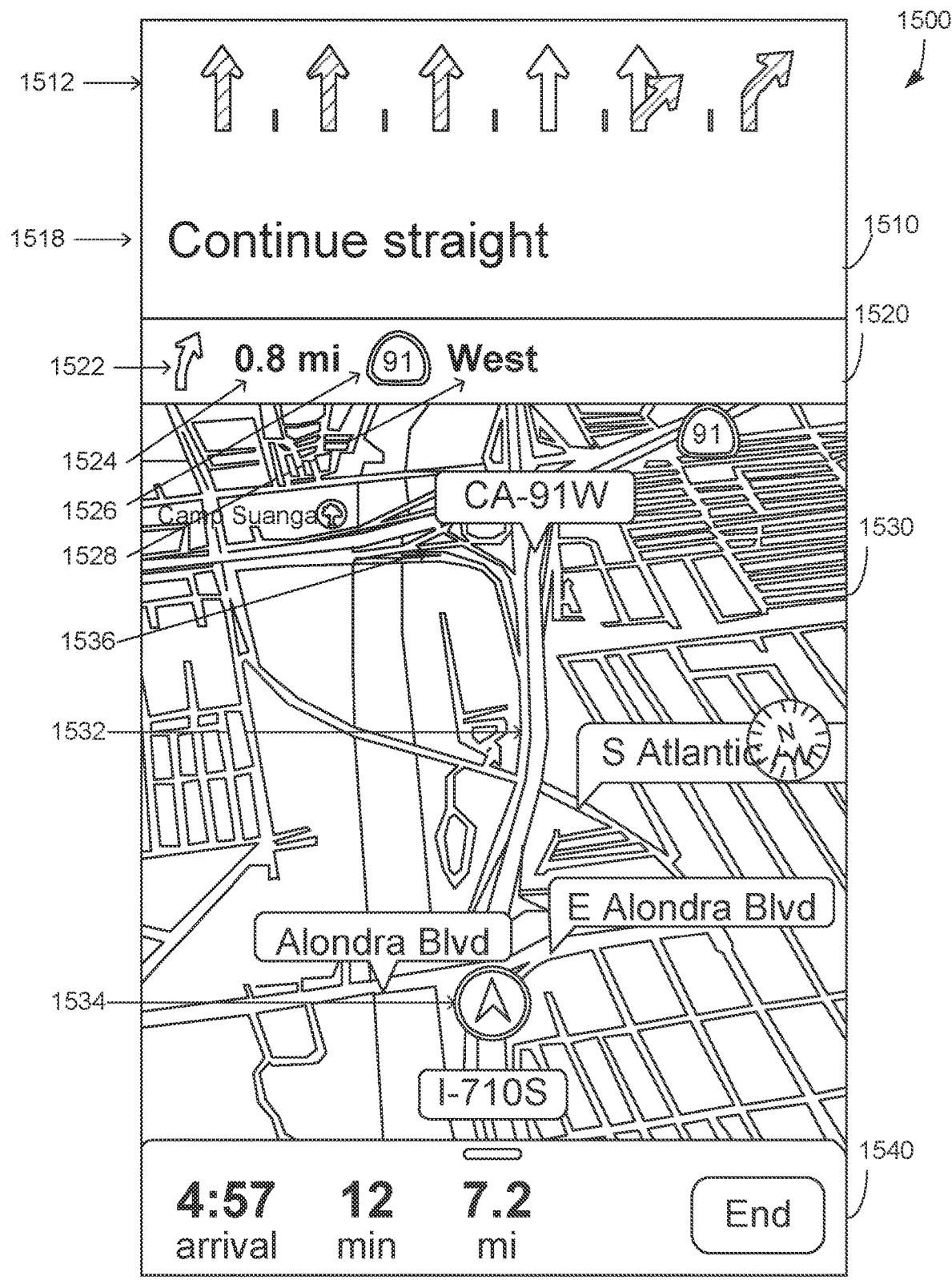
FIG. 15 is an example graphical user interface providing additional guidance in accordance with the disclosed principles.

FIG. 15 illustrates another example graphical user interface (GUI) 1500 that can be presented by navigation application 132 on a display of user device 130. GUI 1500 includes first display area 1510 comprising lane identifiers 1512 and text 1518 for an additional guidance instruction (i.e., "Continue straight"). In the illustrated example, preferred lanes for staying straight are emphasized (e.g., highlighted) or shown in one color in lane identifiers 1512, while the other lanes are deemphasized (e.g., greyed-out) or shown in a second color in lane identifiers 1512. As such, the user is provided additional guidance for proper lane positioning.

In this example, the user's next maneuver will be to stay right on CA-91 W in 0.8 miles, which is shown in second display area 1520 which contains graphic 1522 showing movement to the right, distance indicator 1524, shield 1526 representing a typical road sign for CA-91 with text 1528 indicating west.

GUI 1500 also includes third display area 1530 with a graphical representation 1532 of the user's route. The user's position is shown by indicator 1534. In this example, the route 1532 passes through an interchange 1536 with multiple entrance and exit points, which could be confusing to the user. As such, the additional guidance instruction to "Continue straight" was inserted into the navigation instructions for navigation application 132. GUI 1500 also includes fourth display area 1540 providing overall route information (arrival time, time to arrival, distance) and a selector for ending the navigation.

Figure 16:
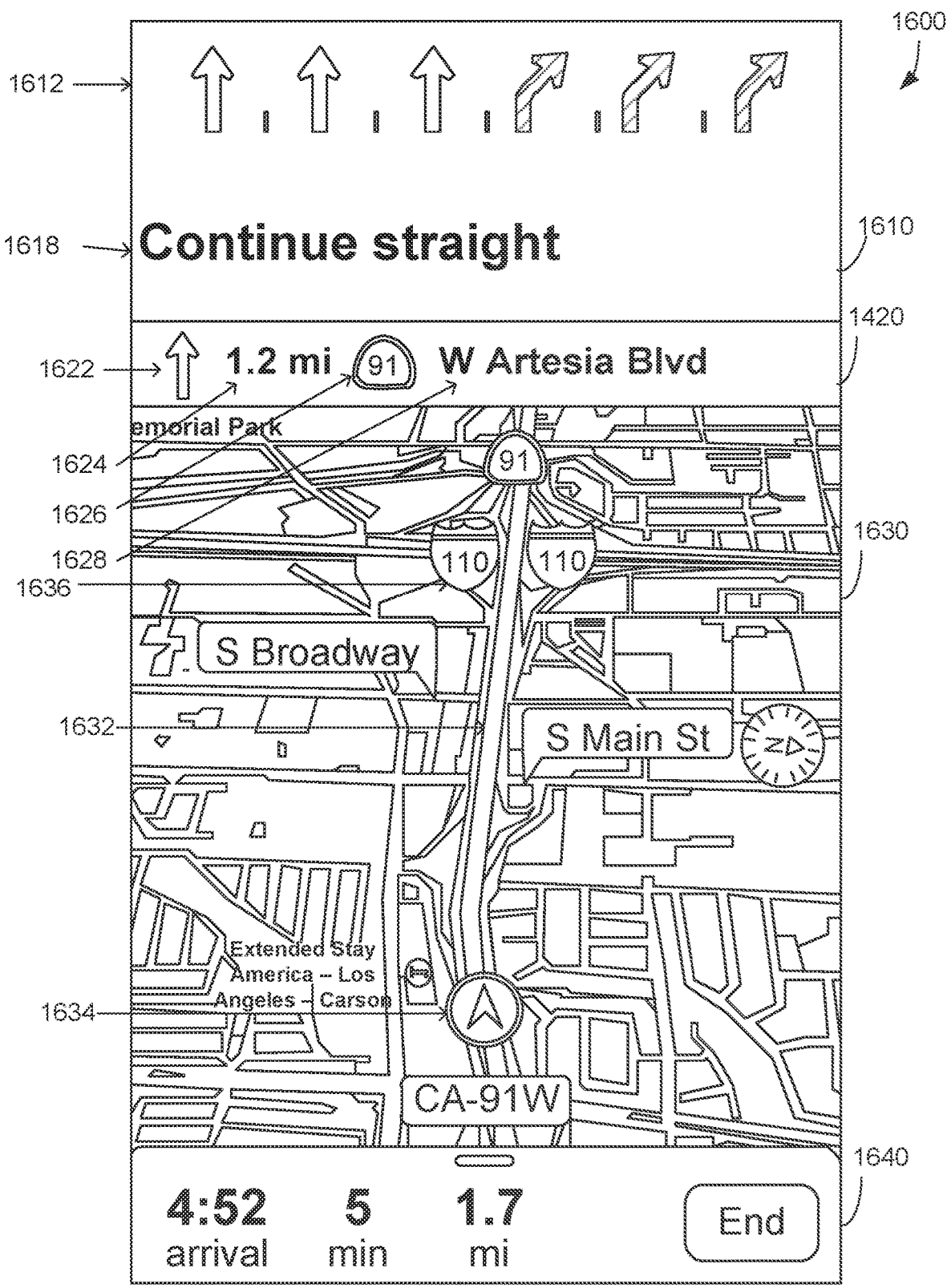
FIG. 16 is an example graphical user interface providing additional guidance in accordance with the disclosed principles.

FIG. 16 illustrates another example graphical user interface (GUI) 1600 that can be presented by navigation application 132 on a display of user device 130. GUI 1600 includes first display area 1610 comprising lane identifiers 1612 and text 1618 for an additional guidance instruction (i.e., "Continue straight"). In the illustrated example, preferred lanes for staying straight are emphasized (e.g., highlighted) or shown in one color in lane identifiers 1612, while the other lanes are deemphasized (e.g., greyed-out) or shown in a second color in lane identifiers 1612. As such, the user is provided additional guidance for proper lane positioning.

In this example, the user's next maneuver will be to stay right on CA-91 W in 1.2 miles, which is shown in second display area 1620 which contains graphic 1622 showing a straight movement, distance indicator 1624, shield 1626 representing a typical road sign for CA-91 with text 1628 indicating west and Artesia Boulevard (another indicator for this portion of CA-91).

GUI 1600 also includes third display area 1630 with a graphical representation 1632 of the user's route. The user's position is shown by indicator 1634. In this example, the route 1632 passes through an interchange 1636 with multiple entrance and exit points, which could be confusing to the user. As such, the additional guidance instruction to "Continue straight" was inserted into the navigation instructions for navigation application 132. GUI 1600 also includes fourth display area 1640 providing overall route information (arrival time, time to arrival, distance) and a selector for ending the navigation.

Figure 17:
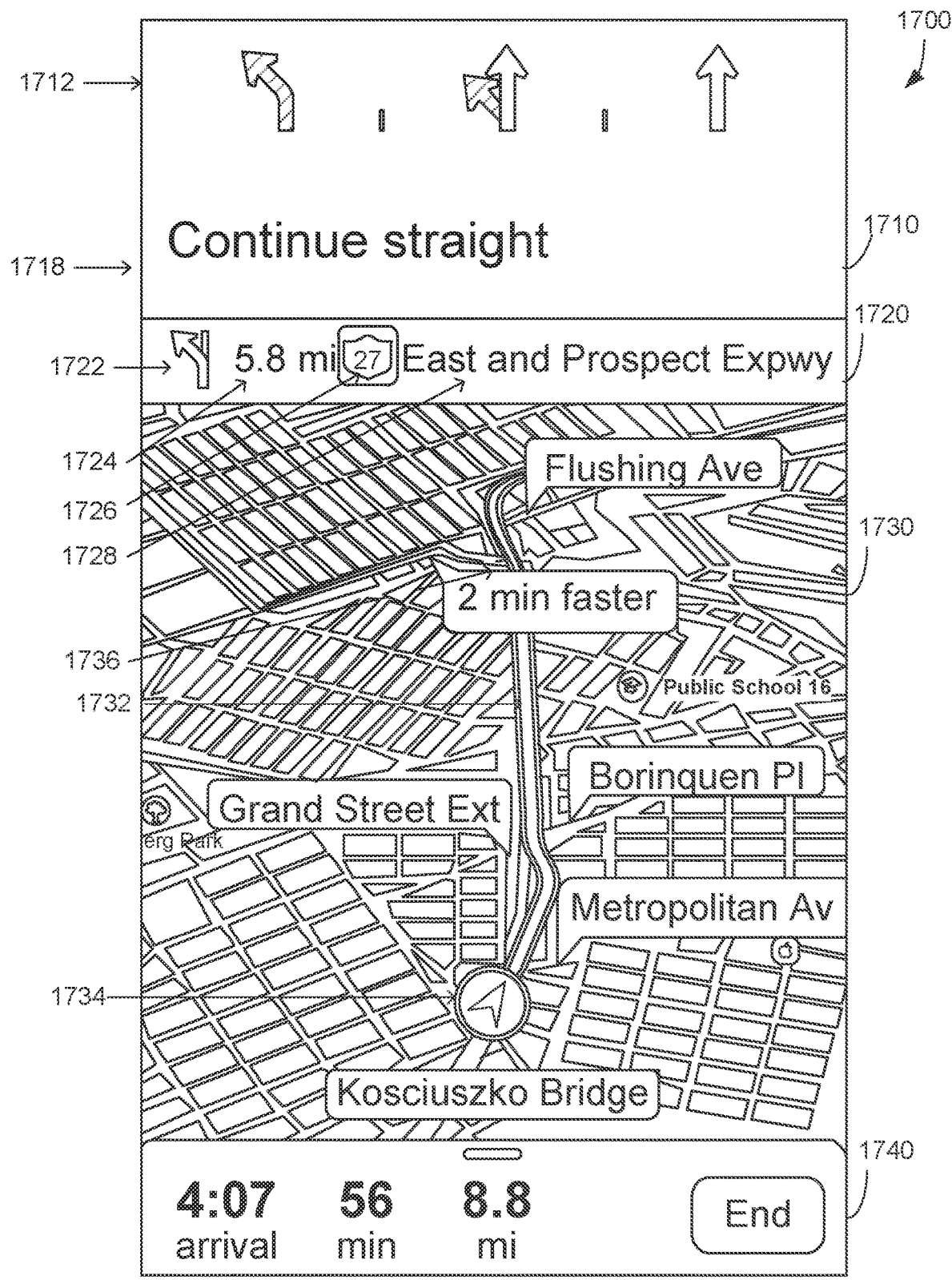
FIG. 17 is an example graphical user interface providing additional guidance in accordance with the disclosed principles.

FIG. 17 illustrates another example graphical user interface (GUI) 1700 that can be presented by navigation application 132 on a display of user device 130. GUI 1700 includes first display area 1710 comprising lane identifiers 1712 and text 1718 for an additional guidance instruction (i.e., "Continue straight"). In the illustrated example, preferred lanes for staying straight are emphasized (e.g., highlighted) or shown in one color in lane identifiers 1712, while the other lanes are deemphasized (e.g., greyed-out) or shown in a second color in lane identifiers 1712. As such, the user is provided additional guidance for proper lane positioning.

In this example, the user's next maneuver will be to move left on New York route 27 in 5.8 miles, which is shown in second display area 1720 which contains graphic 1722 showing movement left, distance indicator 1724, shield 1726 representing a typical road sign for route 27 with text 1728 indicating east and Prospect Expressway (another indicator for this portion of New York route 27).

GUI 1700 also includes third display area 1730 with a graphical representation 1732 of the user's route. The user's position is shown by indicator 1734. In this example, the route 1732 passes has a split 1736 which could cause the user to go off-route. As such, the additional guidance instruction to "Continue straight" was inserted into the navigation instructions for navigation application 132. GUI 1700 also includes fourth display area 1740 providing overall route information (arrival time, time to arrival, distance) and a selector for ending the navigation.

What is claimed is:

1. A method comprising:
    determining, by a computing device, a set of navigation instructions for traversing a route to a destination based on map data retrieved from a storage medium in communication with the computing device, the route comprising a plurality of road segments;
    determining, by the computing device, for a currently traveled road segment of the route, a first set of lanes from which the upcoming maneuver cannot be performed;
    determining, by the computing device, for the currently traveled road segment, a second set of lanes from which the upcoming maneuver can be performed;
    determining, by the computing device, a first number of lanes in the first set of lanes and a second number of lanes in the second set of lanes;
    determining, by the computing device a likelihood that a driver will deviate from the route based on the first number of lanes and the second number of lanes;
    based on the determination of the likelihood, inserting, by the computing device, one or more additional guidance instructions into the set of navigation instructions, the one or more additional guidance instructions identifying the second set of lanes; and
    providing, by the computing device, the set of navigation instructions to a first device capable of presenting the set of navigation instructions.

2. The method of claim 1, wherein determining the likelihood that the driver will deviate from the route comprises determining a lane connectivity value of the currently traveled road segment based on one or more of a length of a lane in the currently traveled road segment, a first ratio based on the first number and the second number, a second ratio based on the first number and a third number of a total of lanes of the currently traveled road segment, and a class of the currently traveled road segment.

3. The method of claim 2, further comprising:
    assigning non-zero weight values to the first ratio, the second ratio, the length of lane, and the class of the currently traveled road segment;
    determining the lane connectivity value based on the weighted first ratio, the weighted second ratio, the weighted length of the lane, and the weighted class of the currently traveled road segment; and
    determining the likelihood that the driver will deviate from the route based on the determined lane connectivity value.

4. The method of claim 1, wherein the step of determining whether to insert the one or more additional guidance instructions comprises:
    determining the likelihood that the driver will deviate from the route based on an estimated lane position of the first device on the currently traveled road segment that is determined based on a connection to a prior road segment on the route as determined by the map data.

5. The method of claim 1, wherein the step of determining whether to insert the one or more additional guidance instructions comprises:
    determining the likelihood that the driver will deviate from the route based on a proximity of the currently traveled road segment to another road segment along the route.

6. The method of claim 1, wherein the step of determining whether to insert the one or more additional guidance instructions comprises:
    determining the likelihood that the driver will deviate from the route based on a proximity of a first maneuver from the currently traveled road segment to a second maneuver from the currently traveled road segment along the route.

7. The method of claim 1, wherein the one or more additional guidance instructions for the road segment is an instruction to enter a preferred lane position of the currently traveled road segment.

8. The method of claim 7, wherein the one or more additional guidance instructions for the currently traveled road segment is an instruction to take an action along the route.

9. The method of claim 1, wherein the one or more additional guidance instructions for the currently traveled road segment is an instruction to bypass an upcoming road segment along the route.

10. The method of claim 1, wherein an amount of additional guidance instructions in the enhanced set of navigation instructions is based on a country location of the first device.

11. The method of claim 1, wherein the first device is traveling on the currently traveled road segment, and wherein the currently traveled road segment represents a road segment that ends at a maneuver juncture corresponding to the upcoming maneuver.

12. The method of claim 1, further comprising:
    identifying that the currently traveled road segment includes a third set of lanes that is less than a threshold distance from the upcoming maneuver;
    determining that the likelihood that the driver will deviate from the route due to the third set of lanes falls below a threshold likelihood; and
    based on the determining, assigning a first weight value to the first set of lanes, a second weight value to the second set of lanes, and a third weight value to the third set of lanes, wherein the third weight value is less than the first weight value and the second weight value.

13. A non-transitory computer-readable medium storing a navigation service program, the navigation service program for execution by at least one processor and comprising sets of instructions for:
    determining, by a computing device, a set of navigation instructions for traversing a route to a destination based on map data retrieved from a storage medium in communication with the computing device, the route comprising a plurality of road segments;
    determining, by the computing device, for a currently traveled road segment of the route, a first set of lanes from which the upcoming maneuver cannot be performed;
    determining, by the computing device, for the currently traveled road segment, a second set of lanes from which the upcoming maneuver can be performed;
    determining, by the computing device, a first number of lanes in the first set of lanes and a second number of lanes in the second set of lanes;
    determining, by the computing device a likelihood that a driver will deviate from the route based on the first number of lanes and the second number of lanes;
    based on the determination of the likelihood, inserting, by the computing device, one or more additional guidance instructions into the set of navigation instructions, the one or more additional guidance instructions identifying the second set of lanes; and providing, by the computing device, the set of navigation instructions to a first device capable of presenting the set of navigation instructions.

14. The non-transitory computer-readable medium of claim 13, wherein determining the likelihood that the driver will deviate from the route comprises determining a lane connectivity value of the currently traveled road segment based on one or more of a length of a lane in the currently traveled road segment, a first ratio based on the first number and the second number, a second ratio based on the first number and a third number of a total of lanes of the currently traveled road segment, and a class of the currently traveled road segment.

15. The non-transitory computer-readable medium of claim 13, wherein the set of instructions for determining whether to insert additional guidance comprises a set of instructions for:
   determining the likelihood that the driver will deviate from the route based on an estimated lane position of the first device on the currently traveled road segment that is determined based on a connection to a prior road segment on the route as determined by the map data.

16. The non-transitory computer-readable medium of claim 13, wherein the set of instructions for determining whether to insert additional guidance comprises a set of instructions for:
   determining the likelihood that the driver will deviate from the route based on a proximity of the currently traveled road segment to another road segment along the route.

17. The non-transitory computer-readable medium of claim 13, wherein the set of instructions for determining whether to insert additional guidance comprises a set of instructions for:
   determining the likelihood that the driver will deviate from the route based on a proximity of a first maneuver from the currently traveled road segment to a second maneuver from the currently traveled road segment along the route.

18. The non-transitory computer-readable medium of claim 13, wherein the one or more additional guidance instructions for the currently traveled road segment is an instruction to enter a preferred lane position of the currently traveled road segment.

19. The non-transitory computer-readable medium of claim 13, wherein the one or more additional guidance instructions for the currently traveled road segment is an instruction to take an action along the route.

20. The non-transitory computer-readable medium of claim 13, wherein the one or more additional guidance instructions for the currently traveled road segment is an instruction to bypass an upcoming road segment along the route.

21. The non-transitory computer-readable medium of claim 13, wherein an amount of additional guidance instructions in the enhanced set of navigation instructions is based on a country location of the first device.

22. A system comprising:
   one or more processors; and
   a non-transitory computer-readable medium storing a navigation service program including one or more sets of instructions that, when executed by the one or more processors, cause the processors to perform operations comprising:
   determining, by a computing device, a set of navigation instructions for traversing a route to a destination based on map data retrieved from a storage medium in communication with the computing device, the route comprising a plurality of road segments;
   determining, by the computing device, for a currently traveled road segment of the route, a first set of lanes from which the upcoming maneuver cannot be performed;
   determining, by the computing device, for the currently traveled road segment, a second set of lanes from which the upcoming maneuver can be performed;
   determining, by the computing device, a first number of lanes in the first set of lanes and a second number of lanes in the second set of lanes;
   determining, by the computing device a likelihood that a driver will deviate from the route based on the first number of lanes and the second number of lanes;
   based on the determination of the likelihood, inserting, by the computing device, one or more additional guidance instructions into the set of navigation instructions, the one or more additional guidance instructions identifying the second set of lanes; and
   providing, by the computing device, the set of navigation instructions to a first device capable of presenting the set of navigation instructions.

23. The system of claim 22, wherein determining the likelihood that the driver will deviate from the route comprises determining a lane connectivity value of the currently traveled road segment based on one or more of a length of a lane in the currently traveled road segment, a first ratio based on the first number and the second number, a second ratio based on the first number and a third number of a total of lanes of the currently traveled road segment, and a class of the currently traveled road segment.

24. The system of claim 22, wherein the set of instructions for determining whether to insert additional guidance comprises a set of instructions for:
   determining the likelihood that the driver will deviate from the route based on an estimated lane position of the first device on the currently traveled road segment that is determined based on a connection to a prior road segment on the route as determined by the map data.

25. The system of claim 22, wherein the set of instructions for determining whether to insert additional guidance comprises a set of instructions for:
   determining the likelihood that the driver will deviate from the route based on a proximity of the currently traveled road segment to another road segment along the route.

26. The system of claim 22, wherein the set of instructions for determining whether to insert additional guidance comprises a set of instructions for:
   determining the likelihood that the driver will deviate from the route based on a proximity of a first maneuver from the currently traveled road segment to a second maneuver from the currently traveled road segment along the route.

27. The system of claim 22, wherein the one or more additional guidance instructions for the road segment is an instruction to enter a preferred lane position of the currently traveled road segment.

28. The system of claim 22, wherein the one or more additional guidance instructions for the currently traveled road segment is an instruction to take an action along the route.

29. The system of claim 22, wherein the one or more additional guidance instructions for the currently traveled road segment is an instruction to bypass an upcoming road segment along the route.

30. The system of claim 22, wherein an amount of additional guidance instructions in the enhanced set of navigation instructions is based on a country location of the first device.

* * * * *